(12) United States Patent
Hatambeiki

(10) Patent No.: US 12,462,273 B2
(45) Date of Patent: Nov. 4, 2025

(54) SYSTEM AND METHOD FOR USING DEVICE DISCOVERY TO PROVIDE ADVERTISING SERVICES

(71) Applicant: Universal Electronics Inc., Scottsdale, AZ (US)

(72) Inventor: Arsham Hatambeiki, Scottsdale, AZ (US)

(73) Assignee: Universal Electronics Inc., Scottsdale, AZ (US)

( * ) Notice: Subject to any disclaimer, the term of this patent is extended or adjusted under 35 U.S.C. 154(b) by 683 days.

(21) Appl. No.: 17/582,882

(22) Filed: Jan. 24, 2022

(65) Prior Publication Data
US 2022/0215425 A1    Jul. 7, 2022

Related U.S. Application Data

(63) Continuation-in-part of application No. 17/539,847, filed on Dec. 1, 2021.

(60) Provisional application No. 63/134,468, filed on Jan. 6, 2021.

(51) Int. Cl.
*G06Q 30/0242*    (2023.01)
*G06Q 30/0251*    (2023.01)

(52) U.S. Cl.
CPC ..... *G06Q 30/0244* (2013.01); *G06Q 30/0243* (2013.01); *G06Q 30/0269* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 4,959,810 | A | 9/1990 | Darbee et al. |
| 5,872,562 | A | 2/1999 | McConnell et al. |
| 7,093,003 | B2 | 8/2006 | Yuh et al. |
| 7,152,237 | B2 | 12/2006 | Flinkinger et al. |
| 7,612,685 | B2 | 11/2009 | Harris et al. |
| 7,653,212 | B2 | 1/2010 | Haughawout et al. |
| 7,974,714 | B2 | 7/2011 | Hoffberg |

(Continued)

FOREIGN PATENT DOCUMENTS

| | | |
|---|---|---|
| CN | 103312573 B | 12/2016 |
| EP | 2148308 B1 | 5/2013 |

(Continued)

OTHER PUBLICATIONS

Betts KR, et al Taking Repeated Exposure into Account: An Experimental Study of Direct-To-Consumer Prescription Drug Television Ad Effects. J Health Commun. 2019;24(5):503-511. doi: 10.1080/10810730.2019.1609139. Epub 2019pr 29. PMID: 31033396; PMCID: PMC9479315. (Year: 2019).*

(Continued)

*Primary Examiner* — Katherine Kolosowski-Gager
(74) *Attorney, Agent, or Firm* — Greenberg Traurig, LLP

(57) ABSTRACT

A system provides advertising by using a device discovery process to automatically determine an information about a home network system of a user. When it is determined that a first advertisement has been caused to be presented via a first content providing service or a first media access device, the information is used to automatically prevent a second content providing service or a second media access device from causing a second advertisement to be presented.

9 Claims, 16 Drawing Sheets

(56) References Cited

U.S. PATENT DOCUMENTS

| | | | |
|---|---|---|---|
| 8,131,737 | B2 | 3/2012 | Ramer et al. |
| 8,606,651 | B2 | 12/2013 | Koike et al. |
| 9,390,436 | B2 | 7/2016 | Ramer et al. |
| 9,600,824 | B2 | 3/2017 | Ogaz et al. |
| 9,699,085 | B2 | 7/2017 | Udupi et al. |
| 10,448,078 | B2 | 10/2019 | Marcus et al. |
| 10,749,990 | B1 * | 8/2020 | Gardiner ................ H04L 67/01 |
| 2002/0038240 | A1 | 3/2002 | Kondo |
| 2002/0123956 | A1 | 9/2002 | Galuten |
| 2003/0191650 | A1 | 10/2003 | Turner et al. |
| 2009/0259515 | A1 | 10/2009 | Belimpasakis et al. |
| 2010/0306114 | A1 | 12/2010 | Bodin et al. |
| 2011/0161175 | A1 | 6/2011 | Aldrey et al. |
| 2011/0302201 | A1 | 12/2011 | Ogaz et al. |
| 2011/0320626 | A1 * | 12/2011 | Wong ..................... H04L 65/75 709/231 |
| 2014/0067538 | A1 * | 3/2014 | Hook ................. G06Q 30/0257 705/14.55 |
| 2014/0282693 | A1 * | 9/2014 | Soundararajan ..... H04N 21/812 725/32 |
| 2015/0019342 | A1 | 1/2015 | Gupta |
| 2016/0358216 | A1 * | 12/2016 | Glover ............... G06Q 30/0267 |
| 2017/0132689 | A1 | 5/2017 | Ogaz |
| 2019/0268646 | A1 | 8/2019 | Reitmeier |
| 2020/0065879 | A1 | 2/2020 | Hu et al. |
| 2020/0204613 | A1 | 6/2020 | Hatameiki et al. |
| 2021/0120301 | A1 | 4/2021 | Xu |
| 2022/0215425 | A1 | 7/2022 | Hatambeiki |
| 2023/0059126 | A1 | 2/2023 | Arling |

FOREIGN PATENT DOCUMENTS

| | | |
|---|---|---|
| EP | 2575115 B1 | 2/2018 |
| KR | 20190132095 A | 11/2019 |
| WO | 2018042675 A1 | 3/2018 |

OTHER PUBLICATIONS

Extended European Search Report from application No. 21918080.9, dated Oct. 10, 2023, 12 pp.

Final office action from U.S. Appl. No. 17/560,333, dated Jun. 22, 2023, 16 pp.

U.S. Patent and Trademark Office, Non-Final Office Action issued in U.S. Appl. No. 17/539,847, dated May 11, 2022, 10 pgs.

U.S. Patent and Trademark Office, Final Office Action issued in U.S. Appl. No. 17/539,847, dated Dec. 27, 2022, 16 pgs.

U.S. Patent and Trademark Office, Non-Final Office Action issued in U.S. Appl. No. 17/560,333, dated Jan. 19, 2023, 13 pgs.

ISA/US, Inter'l Search Report and Written Opinion issued in Appl. No. PCT/US22/53843, dated Feb. 8, 2023, 8 pgs.

International Search Report and Written Opinion of application No. PCT/US2024/049734, dated Jan. 10, 2025, 13 pp.

Extended Search Report from European application No. 22912497.9, dated Nov. 20, 2024, 8 pp.

"Smart Entertainment in the Smart Home" (Whitepaper and associated webpages captured using Internet Archive Wayback Machine on Jun. 1, 2019 and Oct. 31, 2019 at https://quicksetcloud.com/ and https://quicksetcloud.com/media/, and retrieved by the Examiner on Jun. 25, 2024).

Non-final Office Action from U.S. Appl. No. 18/231,924, dated Jun. 30, 2025, 28 pp.

* cited by examiner

| | 802 | 804 | 806 | 808 | |
|---|---|---|---|---|---|
| | Feature | Availability | Value | Rating | |
| | Product A ||||  |
| 812 → | Feature 1 | Yes | Parameter 1 | 8 | |
| 812 → | Feature 2 | Yes | Parameter 2 | 5 | 810 |
| 812 → | Feature 3 | No | Parameter 3 | 0 | |
| etc. | Feature 4 | Yes | Parameter 4 | 3 | |
| | etc... | ... | ... | ... | |
| | Product B |||| |
| | Feature 1 | Yes | Parameter 1 | 6 | 810 |
| | Feature 2 | Yes | Parameter 2 | 9 | |
| | etc... | | | | |
| | Product C |||| 810 |
| | | | | | etc... |

SYSTEM AND METHOD FOR USING DEVICE DISCOVERY TO PROVIDE ADVERTISING SERVICES

RELATED APPLICATION INFORMATION

This application claims the benefit of and is a continuation-in-part of U.S. application Ser. No. 17/539,847, filed on Dec. 1, 2021, which application claims the benefit of U.S. Provisional Application No. 63/134,468, filed on Jan. 6, 2021, the disclosures of which are incorporated herein by reference in their entirety.

BACKGROUND

Personal communication, productivity, and entertainment devices such as cellular phones, PDAs, portable email devices, tablet computers, e-books, hand-held games, portable media players, etc. (all referred to hereafter as "smart devices") are known to include features such as graphical user interfaces on color touch screens and/or voice-enabled interfaces, Bluetooth and/or WiFi capability, etc. Increasingly, such smart devices also incorporate support for ancillary applications (hereafter referred to as "apps," "skills," etc.) for example calendars, email, maps and navigation, etc. Such ancillary applications may be pre-installed in a smart device or may be made available for download by a consumer.

Portable controlling devices capable of commanding the operation of multiple consumer appliances of different type and/or manufacture, such as universal remote controls, and the features and functions offered by such devices are also well known in the art. Sophisticated implementations of these devices incorporate technologies such as color touch screens, wireless home network compatibility, user configurable graphical user interfaces, slave relay stations positioned to control appliances not situated in line of sight of the controlling device, etc. In some cases such controlling device functionality may be offered in the form of an app for installation on an existing smart device, said app comprising a GUI to be used in conjunction with supplemental hardware and/or firmware, built-in or external to the smart device, suitable for the generation of appliance command signals. In other cases, such controlling devices may be self-contained units specific to that purpose such as for example Nevo® brand products from Universal Electronics Inc., or Harmony® brand products from Logitech Inc. Yet further, such controlling devices may be in the form of voice-enabled devices, such as the "NEVO BUTLER" brand personal assistant.

Regardless of the exact manner in which universal controlling device functionality is implemented, in general such devices or apps may require configuration or "set up" prior to use, i.e., an appropriate set of command data from within a library of command data sets must be associated with each of the specific appliances to be controlled, for example by entry of data that serves to identify each intended target appliance by its make, and/or model, and/or type; by testing various command formats sequentially, via command transmissions, until an appliance response is observed; by sampling signals of original equipment remote controls; etc.; all as known in the art. Since systems and methods for setting up universal controlling devices to command the operation of specific home appliances are well-known, these will not be described in greater detail herein. Nevertheless, for additional information pertaining to setup procedures, the reader may turn, for example, to U.S. Pat. Nos. 4,959,810, 5,872,562, 7,093,003, 7,653,212, 7,612,685, or U.S. application Ser. No. 16/717,546, all of which are incorporated herein by reference in their entirety.

Systems and methods for using information obtained from a universal controlling device are also known in the art. For example, U.S. application Ser. No. 13/118,682, filed on May 31, 2011, which application is incorporated herein by reference in its entirety, describes a system wherein, once such controlling device setup has been successfully performed, information regarding a consumer's appliance configuration gathered thereby may be advantageously used to provide additional services to the consumer, such as advice in the selection of additions or replacements to an existing equipment configuration, recommendations for preferred interconnections, etc.

SUMMARY

This disclosure relates generally to the configuration of home appliance systems, and in particular to methods for using information obtained during one or more home appliance and/or home network configuration processes to providing advertising services.

A better understanding of the objects, advantages, features, properties and relationships of the disclosure will be obtained from the following detailed description and accompanying drawings which set forth illustrative embodiments and which are indicative of the various ways in which the principles of the disclosure may be employed.

BRIEF DESCRIPTION OF THE DRAWINGS

For a better understanding of the various aspects of the disclosure, reference may be had to preferred embodiments shown in the attached drawings in which:

FIG. 8 illustrates a product feature database which may be used in conjunction with the algorithm of FIG. 7;

DETAILED DESCRIPTION

The following describes systems and methods for using data obtained during one or more device and/or system configuration processes to provide advertising services. The advertising services can include recommendations for products and/or services that are selected based upon the obtained data.

Figure 1A:
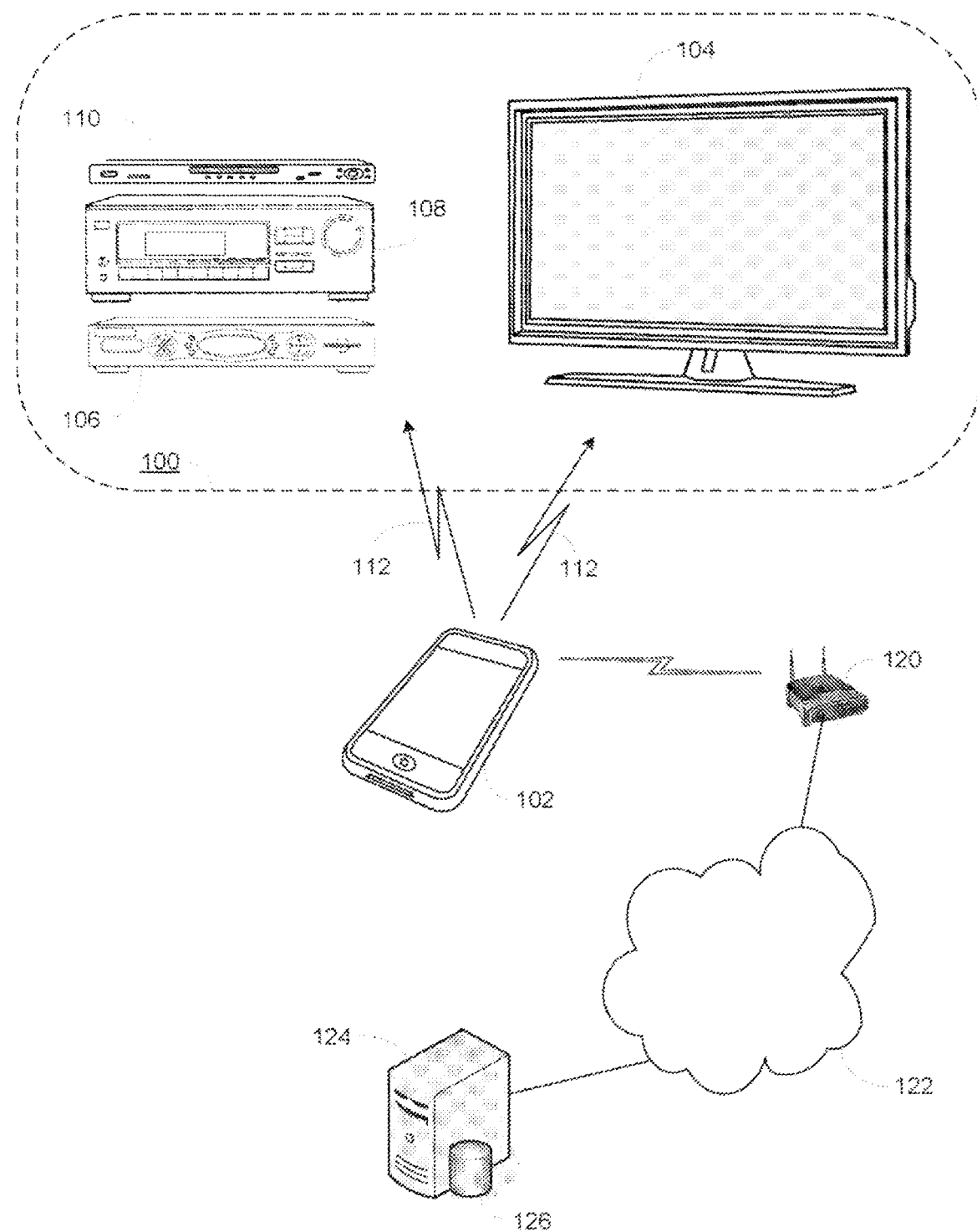
FIGS. 1A and 1B illustrate exemplary systems in which a product recommendation app according to the instant disclosure may be utilized.
Figure 1B:
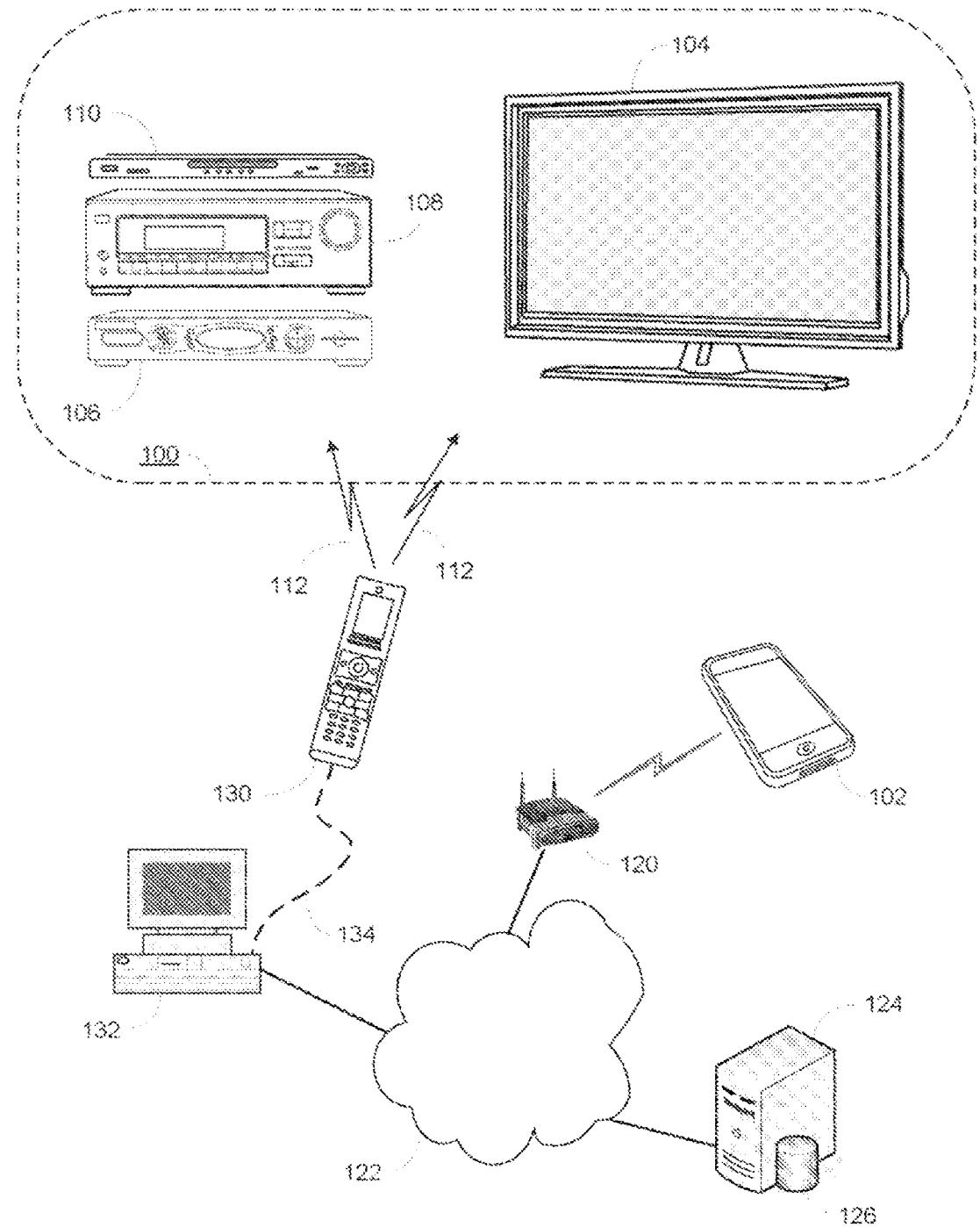

FIGS. 1A and 1B illustrate an example system 100 wherein a smart device 102, e.g., a phone, a remote control, a voice-enable assistant, a television, etc., may be used to acquire data regarding a consumer's system of controllable appliances such as a TV 104, set top box (STB) 106, AV receiver 108, DVD player 110, etc. While illustrated in the context of a home entertainment system comprising a TV, STB, DVD player and AV receiver, it is to be understood that controllable appliances may include, but need not be limited to, televisions, VCRs, DVRs, DVD players, cable or satellite converter set-top boxes ("STBs"), media streaming devices, amplifiers, AV receivers, CD players, game consoles, home lighting, drapery, fans, HVAC systems, thermostats, personal computers, etc.

In the illustrative example of FIG. 1A, a smart device 102 includes both a product recommendation app and a resident universal remote control app, which apps may be provisioned separately or in combination as a package as appropriate for a particular embodiment. The universal remote control app serves to adapt the smart device 102 to command the operation of the illustrated appliances while the product recommendation app serves to advise a user of smart device 102 regarding suitable additions or substitutions to equipment configuration 100, usage thereof, to advertise products and/or services to the user, and/or the like as will be described in detail hereafter. Appliance commands may be issued in the form of infrared signals 112 as illustrated, or in any suitable format, e.g., via an RF signal such as contemplated by RF4CE, Zigbee, Bluetooth, etc.; ultrasonic signal; visible light; etc. as appropriate for the control of each particular appliance. In the example of FIG. 1A these command signals may be issued directly by smart device 102 using, for example, the technology described in U.S. patent application Ser. No. 13/043,915 or alternatively may be issued by a relay device which is in wireless communication with smart device 100 using, for example, the technology described in U.S. patent application Ser. No. 13/071,661, both of which are incorporated herein by reference in their entirety. In addition, smart device 102 may be capable of communicating with a server 124 via, for example a WiFi or cellular wireless access point 120 and a wide area network 122 such as the Internet or PSTN. Server 124 may support a database 126 comprising downloadable command codes and data, equipment setup configurations, appliance datasheet and compatibility information, recommendation database, etc. as required for a particular embodiment.

As illustrated in FIG. 1B, in an alternative configuration appliance control functionality may reside in a physically separate smart device such as a universal remote control 130, a virtual voice, personal assistant (such as the "AMAZON" "ECHO" brand voice assistant), or the like without limitation. The smart device 130 may be configurable via a PC 132, standalone or in conjunction with a server-based database 126, using any convenient wired or wireless connection 134 as is well known in the art. In alternative embodiments smart device 130 may communicate directly with server 142 via a wireless link and access point 120. In the examples of both FIGS. 1A and 1B however, appliance data, i.e., type, brand, and model information, equipment configuration, etc., that is gathered during setup and programming of a controlling device and/or a home network may be made available to a product recommendation app resident in smart device 102, either directly from the controlling device 130, from the smart device 102 accessing a cloud server 124 to which such data has been previously provided by the controlling device 130, etc. The product recommendation app can itself provide information to and/or receive information from cloud-based servers as needed, e.g., to facilitate the presenting of targeted advertising to a user via use of the smart device 102 and/or another smart device known to be a part of the home network.

Figure 2:
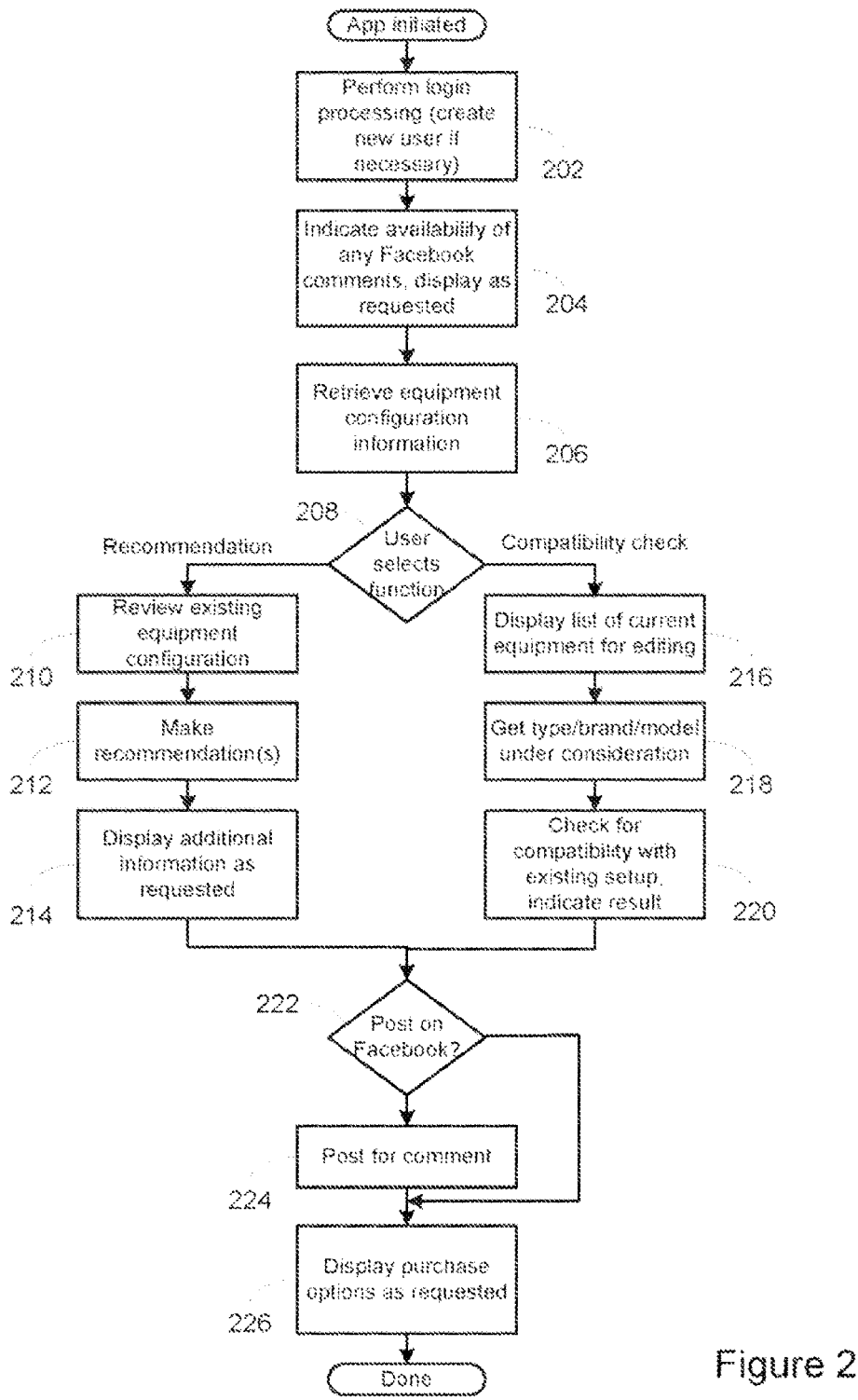
FIG. 2 illustrates, in flowchart form, the operation of an exemplary product recommendation app.
Figure 3:
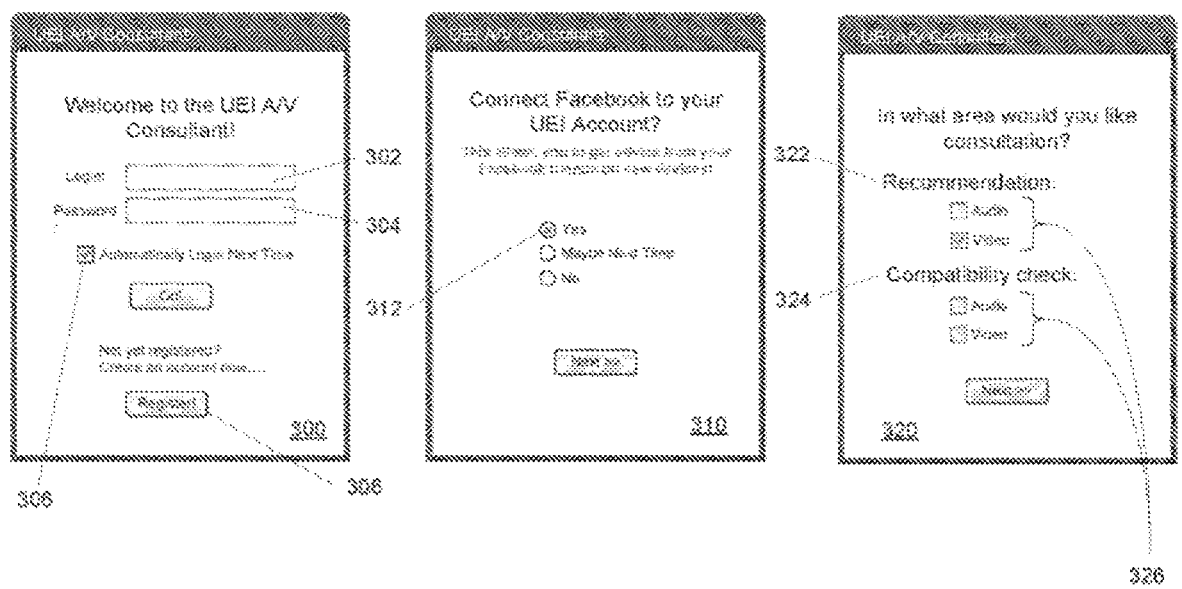
FIGS. 3 through 6 illustrate smart device screen displays during the operation of an exemplary product recommendation app.
Figure 4:
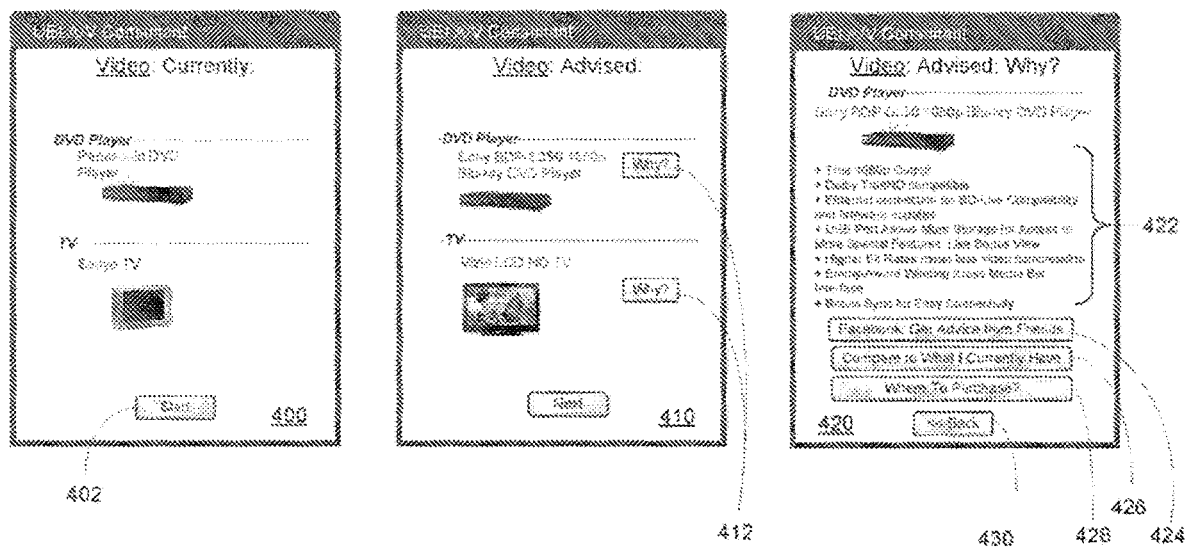
Figure 5:
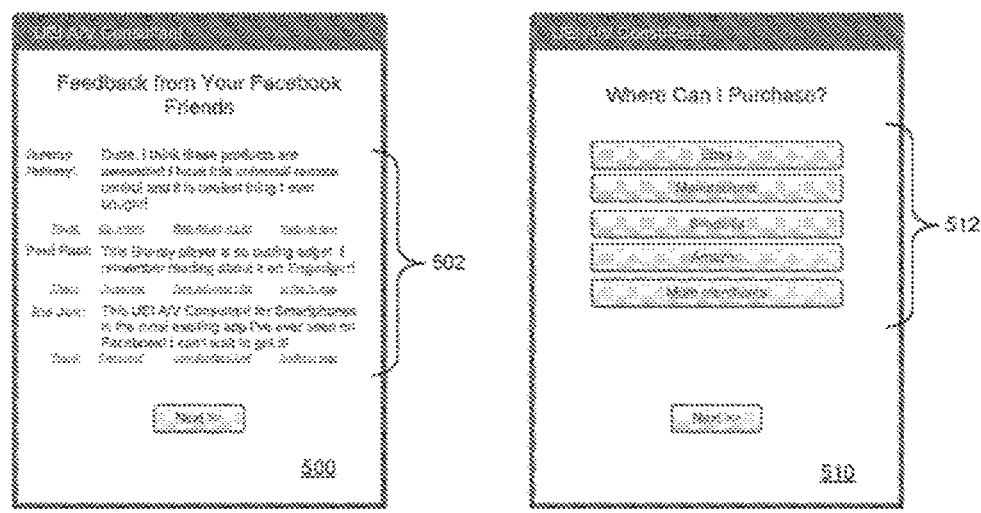
Figure 6:
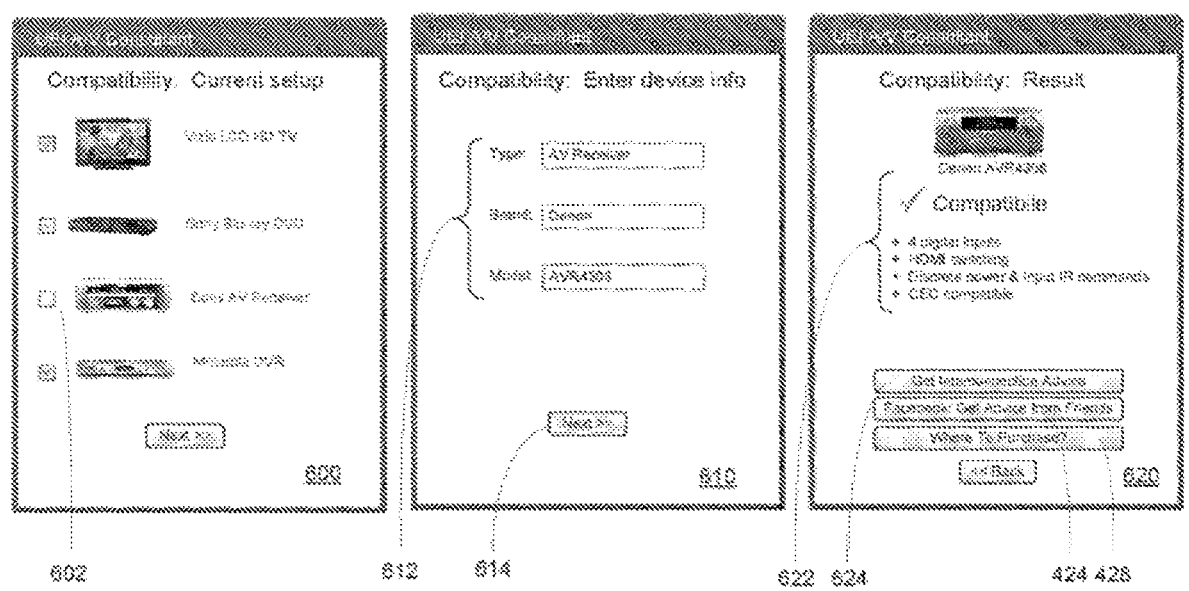

With reference now to the flowchart of FIG. 2 and accompanying illustrative screen displays of FIGS. 3 through 6, an example product recommendation app, e.g., an application implemented via computer-executable instructions stored on one or more non-transient, physically embodied storage media of one or more devices such as a server, smart device, and/or the like, may, upon initialization at step 202 request that a user enter a login name 302 and password 304 which may be used to identify a particular user and their current equipment configurations. In some embodiments, this user identity may correspond to a user account which has already been created elsewhere, for example created on server 124 in connection with configuring a PC-editable smart device 130, while in other embodiments this user account identity may be unique to the product recommendation function, in which latter case a first-time user may be required to register and create an account, for example by activating a "Register" icon as illustrated at 308. In either case, a user may also be able to request that the login screen be bypassed in the future, for example as illustrated by check box 306.

In addition, as part of the login process a user may be offered an opportunity to link to a social networking account such as, for example and without limitation, a "FACEBOOK" brand social networking account as illustrated at 310. Selecting "Yes" 312 may take the user to a screen wherein the desired account information is entered. Where the user already has a linked account, at step 204 screen 310 may be substituted by a display indicating whether or not there are unread friend comments pending at the social networking site. If there are, at the request of the user these comments 502 may be displayed as illustrated in the exemplary computer screen 500 of FIG. 5.

Once login is complete, at step 206 the current equipment configuration data associated with that user account may be retrieved by the product recommendation app in preparation for the steps which are to follow. As will be appreciated, such configuration data may be stored locally on smart device 102, on a local PC 132, on a remote server 124, or a combination thereof as appropriate for a particular embodiment. Next, at step 208 the user is offered a choice of a product recommendation (where "products" may include apps, services, content, and physical devices) or a product compatibility check, as illustrated at screen 320. In this context, a product recommendation comprises a review of the items in a user's current equipment configuration with the objective of generally suggesting improvements and/or additions to the user's current equipment configuration; while a compatibly check comprises a review of a particular user-specified product which is not currently part of an equipment configuration, with the objective of determining if this item is compatible with the existing equipment as currently configured. As illustrated by checkboxes 326, a user may be provided with an opportunity to further limit these reviews to only certain products or functionalities, for example audio or video appliances or functionalities as illustrated (or both, if more than one box is checked.)

Considering first the product recommendation mode, at step 210 the existing equipment configuration may be retrieved and displayed to the user as illustrated for example at screen 400. Once a user has verified that the retrieved configuration is correct, for example by selecting "Start" 402, the listed configuration may be reviewed for adequacy and compatibility. In this regard, it will be appreciated that the steps comprising the review algorithm may be performed locally on the smart device, performed remotely at an associated server, cloud-based and/or local, or a combination thereof as appropriate for a particular embodiment. Similarly, it will be understood that data indicative of the current equipment configuration and data used for reference during the review process may be either locally resident on the smart device or hosted by a server, in any convenient combination.

In determining the adequacy of an existing configuration an exemplary review algorithm may, for instance when applied to the illustrative AV system configuration 100, consider factors such as:

Ability of a device and/or system to support currently available (and/or future) formats, e.g., HDTV, Blu-ray DVD, DTS audio, 3DTV, etc.;

Ability of a device and/or system to support currently available (and/or future) content delivery methods, e.g., on-line video and audio streaming services, IPTV, HD radio, etc.;

Ability of a device and/or system to support currently available (and/or future) connectivity, e.g., HDMI, WiFi and/or Ethernet capability, USB and SD card interfaces, etc.;

Energy efficiency of a device; and

Inconsistencies in the existing device and/or system configuration, e.g., a Hi-Def DVR or Blu-ray player connected to a Standard Definition TV.

Once any inadequacies or inconsistencies have been identified, at step 212 recommended improvements for a device/the system may be determined and presented to the user, for example as illustrated in screen shot 410. In this regard, factors that may be considered in identifying suggested replacements or additions to the device(s) and/or system configuration may include:

Features and capabilities of a device and/or system necessary to rectify the identified inadequacies;

Support by a device for nascent technologies (i.e., future proofing);

Cost of recommended device(s), which factor may be influenced by the price brackets represented by the existing system devices;

Dimensions of a device;

Operational compatibility of a device, e.g., support for CEC, EDID, RF4CE, etc.;

Reliability and/or user satisfaction ratings for a device;

Device purchase statistics derived from a user's peer group, i.e., other consumers with similar device and/or system configurations and/or demographics.

In certain embodiments, user-specified filtering parameters may also be applied during this identification process, for example upper limits on price and/or dimensions, brand preference, etc. Input of such parameters may be solicited from a user at the start of the recommendation process (i.e., in conjunction with steps 210 and 212), or may be provided during initial installation and setup of the product recommendation app, as appropriate.

In addition, where a database of device command code sets is available for reference, for example where the product recommendation app is provided by or hosted by a manufacturer of universal controlling devices or of universal remote control apps for smart devices, the suitability of an appliance's command set may also be taken into account, for example:

Availability of discrete power and input selection commands by a device in support of activity macros;

Preferred method of command transmission by a device, e.g., if a majority of the other devices in the existing configuration support non-line-of-sight command transmissions, such as for example the RF4CE protocol, preference may be given to replacement devices which are compatible with that command protocol;

Possible conflicts in command code format with devices already present in the existing configuration; etc.

Figure 7:
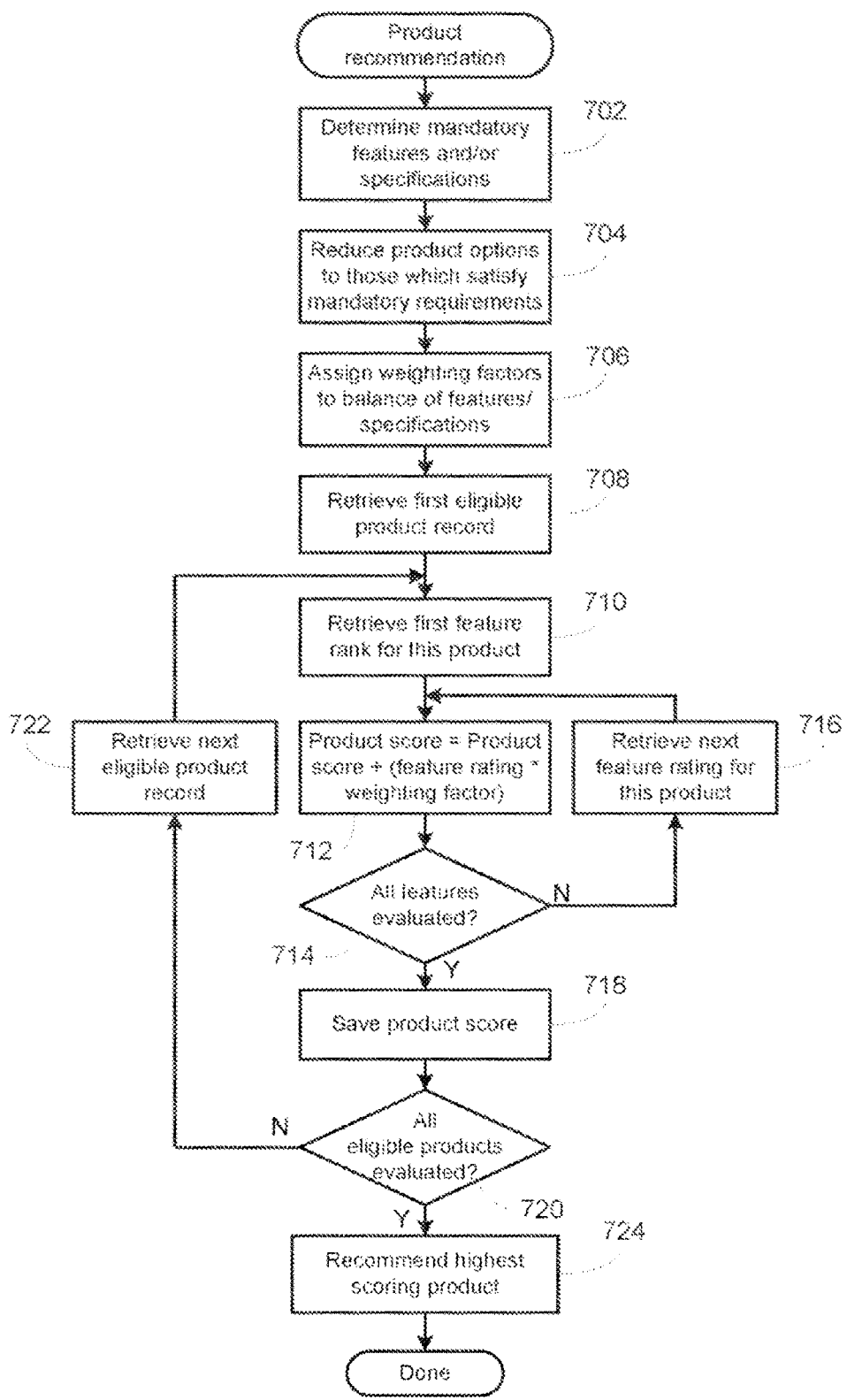
FIG. 7 illustrates, in flowchart form, an exemplary product recommendation algorithm.

By way of further example and without limitation, a product recommendation method and associated database are illustrated in FIGS. 7 and 8. Turning to FIG. 7, at step 702 first a determination is made as to which product features are mandatory. These may include, for example, support for formats necessary for compatibility with other existing equipment (with all of equipment, devices, appliances, items, and products being interchangeably used herein as appropriate) in a user's configuration (e.g., HDTV compatibility), regional requirements (e.g., supply voltage, DVD region, PAL vs NTSC, etc.), user-supplied filtering parameters such as maximum price or dimensions, etc. Next, at step 704 a product selection database may be scanned and those entries which satisfy the mandatory requirements selected as entries that are eligible for further examination.

With reference to FIG. 8, an exemplary product recommendation database 800 may comprise a series of product records 810, each record in turn comprising a series of feature definition entries 812, each feature definition entry comprising a series of fields 802 through 808. Field 802 may be a feature reference or type (e.g., HD capable, HDMI input, reliability rating, user survey rating, etc.), field 804 may contain an indicator as to whether this feature is available on that particular product, field 806 may contain any parameter associated with that feature (e.g., screen resolution, number of inputs, etc.), and field 808 may comprise a rating value (e.g., between zero to ten) representative of the completeness or functionality of that particular feature as implemented within that product, or in the case of survey results, etc., a value representing a relative ranking within that appliance's peer group. For a feature which is absent, rating value entry 808 may be zero. As will be appreciated, though illustrated for convenience as a unified data set, in practice the data values corresponding to the fields of database 800 may be distributed across multiple locations, for example any or all of the fields 802 through 808 may comprise a pointer to a data value located elsewhere, such as a manufacturer's website, a product rating organization's report database, etc. In the illustrative example, any or all of the contents of fields 802 through 806 for each product maintained in the database may be examined during the initial selection process of step 704.

Once a set of qualifying products has been selected, at step 706 a weighing factor may be assigned to each of the remaining non-mandatory features based on that feature's relative importance to the known equipment configuration in which it is to be used. In some embodiments, some or all of such weighing factors may also be user-adjustable according to personal preferences, e.g., cost. After weighing factors are established, at step 708 a first product record from the set of eligible records is retrieved, and at steps 712, 714, and 716 a product score may be accumulated, calculated in the illustrative example as the sum of the products of each participating feature's rating 808 and the weighing factor established in step 706. Thereafter, at step 718 the total score for that product may be saved, and at steps 720 and 722 the process repeated until all eligible products have been scored. Upon completion of score calculations, at step 724 the highest scoring product may be returned as a recommendation and the process is complete.

Figure 9:
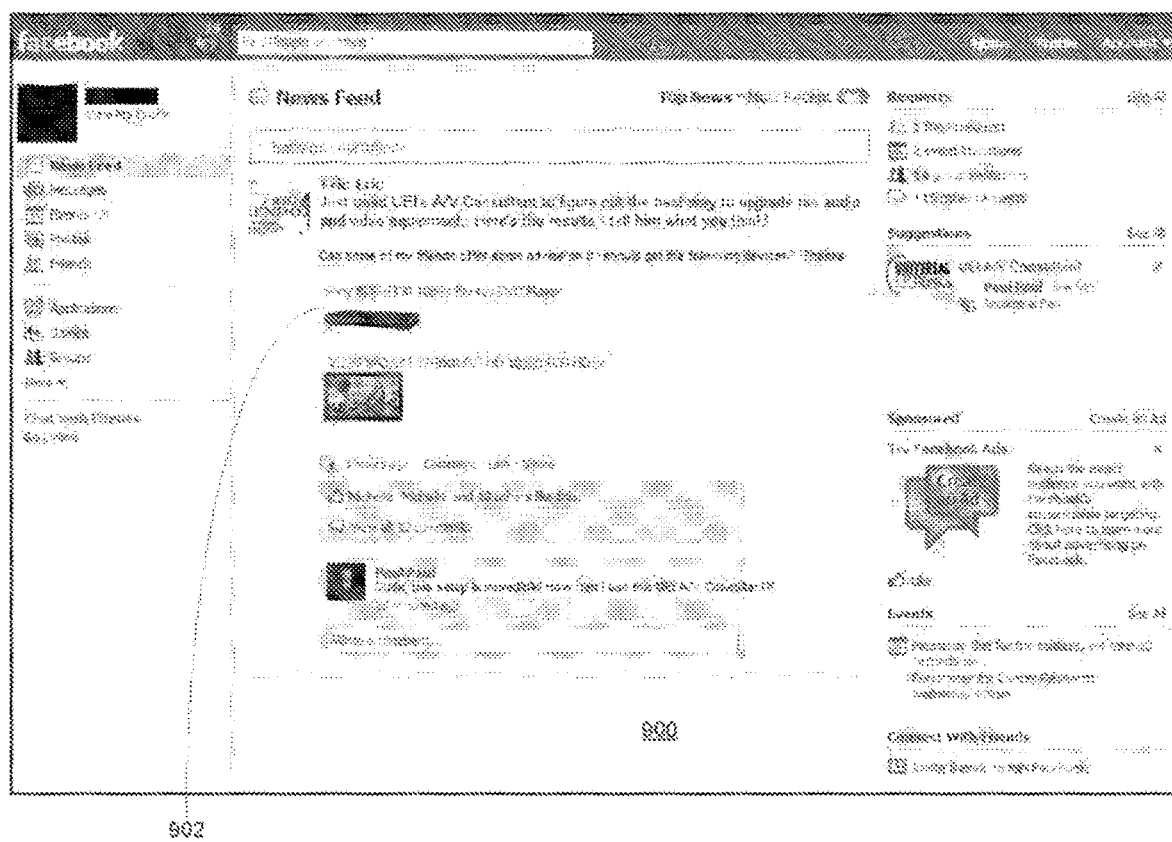
FIG. 9 illustrates an exemplary "Facebook" brand social media page soliciting friends' opinions regarding a recommended product.

Once suggested replacement or add-on products (which may include apps and/or services) have been thus identified, these may be displayed to the user of the smart device, for example as illustrated in display 410. Returning to FIG. 2, at step 214 the user may be presented with an opportunity to display additional information regarding the recommended products, for example via activation of an icon 412 as illustrated. Selection of one of the icons 412 may result in the display illustrated at screen 420. This display may include a summary 422 of the features of the recommended product together with icons representing possible next actions by the user, for example: posting the recommendation to a user's social networking account for comment using icon 424, comparison of the recommended item to the product it is to replace in the current system configuration (if any) using icon 426, obtaining product purchase information using icon 428, or returning to screen 410 to review other recommended products (if any) using icon 430. As illustrated in FIG. 9, selection of icon 424 at step 222 may result in the posting at step 224 of information 902 regarding the recommended product to that user's social networking page 900. Selection of icon 428 may result in a display at step 226 as illustrated at screen 510, comprising a listing 512 of links to merchants selling the recommended item. As will be appreciated, such merchant information may be obtained via use of known web-scraping technologies, may be provided by the merchants themselves (e.g., via an affiliates agreement), or the like.

Considering now the product compatibility or "shopping companion" mode of system usage, a consumer may wish to use the smart device app of the current disclosure to verify the compatibility of a particular electronic appliance with their existing configuration, based upon for example an advertisement, a recommendation from a friend or a salesperson, a store display, etc. In such cases, after initiating the product recommendation app as described previously, at step 208 the compatibility check mode 324 may be selected. Initially, at step 216 a listing of the user's currently configured electronic appliances may be displayed as illustrated at screen 600 of FIG. 6. In the example, the user may be afforded an opportunity to remove from that configuration any product which is to be replaced by the new product under consideration, for example by causing a box to be "unchecked" as illustrated at 602, thereby removing that appliance from the compatibility check process which is to follow. After completing any such input, a user may confirm the remaining equipment configuration and proceed to step 218 by selecting a "next" icon 604. At step 218, the user may be prompted to identify the type, brand, and model of appliance under consideration, as represented by fields 612 of screen 610. As will be appreciated, such identification may be by selection from a drop-down list, direct text entry with or without auto-complete, voice input, etc., as appropriate. In addition, the system may automatically identify the appliance under consideration from an uploaded photograph of the appliance under consideration, its packaging, or the like; from a captured product code associated with the appliance under consideration such as for example a UPC barcode, an RFID tag, or the like; a link to a product detail page; etc. Once entry of such identification information is complete, a user may initiate a compatibility check by once again selecting "next" 614.

At step 220, a compatibility check algorithm may be performed. The factors considered in this process may be similar to those previously enumerated above, but excluding for example cost and dimensions since these are no longer variables. In addition, the compatibility check may incorporate further steps such as verifying that a sufficient number of suitable connections and input/output ports are available to allow optimal integration of the proposed appliance in the system, etc. Once compatibility checking is complete, at step 220 the result may be displayed to the user as illustrated at screen 620. An exemplary display may include a summary 622 of the salient points considered in determining compatibility. Some embodiments may include an option for the display of additional information screens containing, for example, recommended interconnection schemes and methods, etc., which in the illustrative example may be accessible via icon 624. In addition, options for posting to social media 424 and locating a merchant 428 may be offered as previously described.

In a further example, the subject recommendation system may be used by consumers who are planning to upgrade their smart home or current set of connected smart devices with the intention of enhancing their smart home experience. The recommender will provide ideas, for example in the form of advertisements, to consumers which will help them with decision making before the consumer buys and/or installs an additional smart device or smart device related product, e.g., an app or a skill, for use in their home. The system can recommend the most popular smart devices, brands, and models, the device or brand combination that is most popular, most often bought and sought after, additional smart devices/products most commonly used by the customers having similar configuration, etc. which will also ensure interoperability of the recommended products with the current setup. In some circumstances, the consumer's geo location, zip code, or other region identifier can be used such that recommendations can be narrowed down or clustered based on availability of product/service providers in the consumer's neighborhood making the recommendations more accurate and customized for the consumer.

For determining the current configuration of the consumer's system (e.g. installed appliances, accessories, apps, and/or the like), the recommendation system can use one or more of the discovery processes described in U.S. application Ser. No. 13/657,176, which application is incorporated herein by reference in its entirety. For example, the current configuration of the consumer's system/devices can be determined via use of a process that functions to autodetect connected IOT devices in a home network. The information collected during such a process will feed the recommender with the user's current system and/or device setup, the inclination of the user towards buying a specific category or brand of product, etc. This information, along with the history of recommendations the user has previously requested, if any, can be stored in a backend database, such as an "Azure" SQL database, and the stored information may be incorporated into future recommendations/advertisements which will resonate even more with what a user may want. Furthermore, the stored user information can be clustered based on a neighborhood (or other geographic region) and the clustered information can be used by retailers to provide targeted advertisements or specific offerings in the clustered area by studying the choices made by consumers in that pocket, area, or zip code.

For providing the recommendations, the system will use a device knowledge base, e.g., device identity and attribute information collected from product manuals, product inspections, manufacturer inquiries, and the like as well as marketing information, and a level of analytics that is performed on the device knowledge base. In a preferred embodiment, these analytics will employ association rule learning, for example using Apriori (a machine learning modeling technique), to find associations of interest, such as the associations between most bought brands, devices, and/or models, attribute features of devices, and/or the like in the smart home category. The rule learning will help to collect and link associations between devices (e.g., associations as to which devices in similar configurations consumers across the globe use) thereby feeding the recommender with the data that indicates what product(s) to suggest to the user. Data from Web crawlers can also be fed to the association rule learning algorithm as an alternate input to ensure that the recommendation encompasses any new brands, models, and devices/products being released in the market. This information will further strengthen the ability of the recommender to make recommendations that are supremely useful for consumers. Thus, the subject recommender system (which learns from actual customer's preferences and which provides a robust machine learning engine that will adjust and change the recommendations to a customer based on the latest trends learned from the market) will eliminate the need for customers to spend a hefty amount of time researching the statistics about different devices (which most of the time is not from a reliable source) in order to decide what device/model/brand to purchase.

Figure 10:
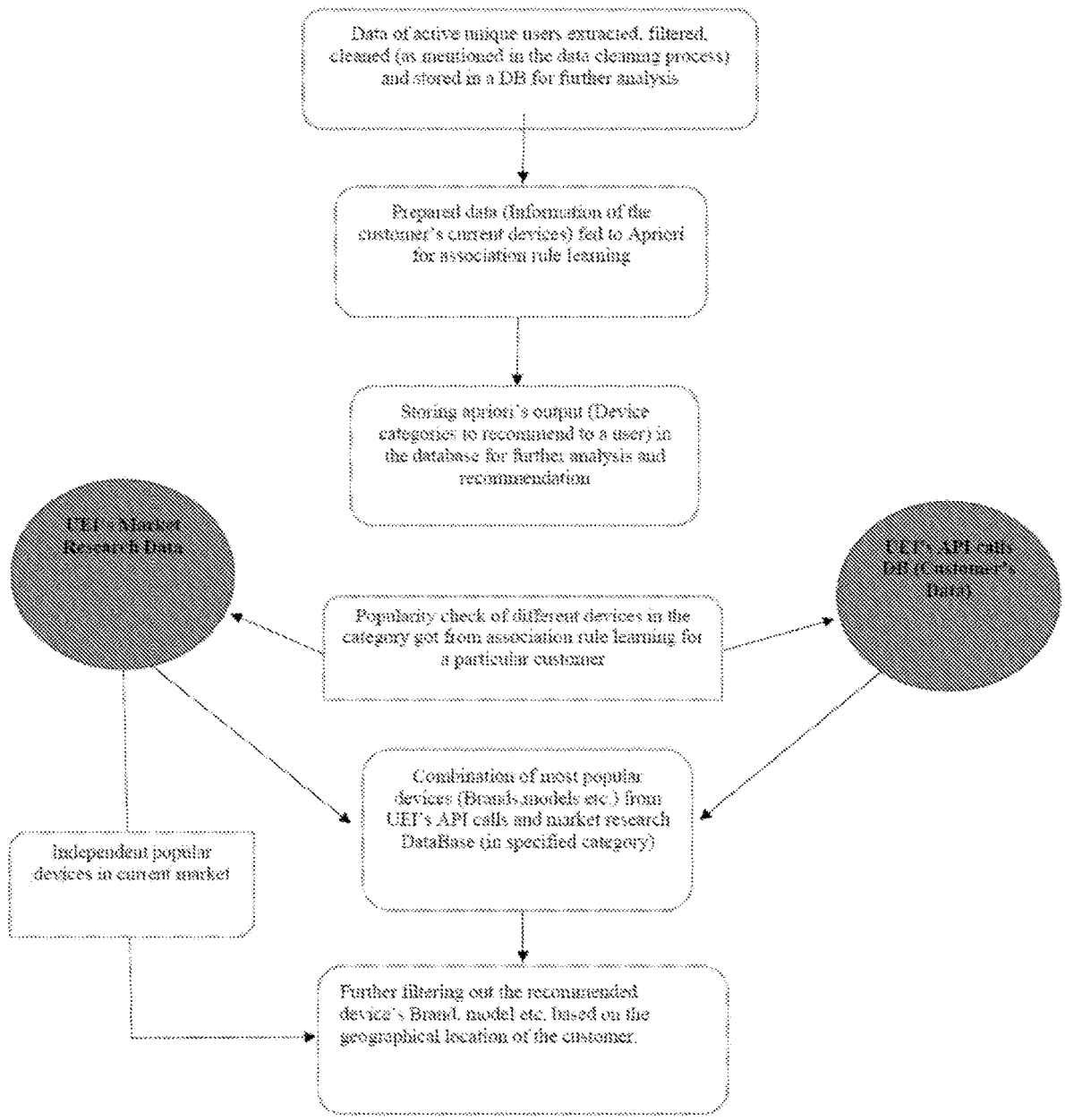
FIG. 10 illustrates an example method for building a recommender engine and an underling recommendation process.
Figure 11:
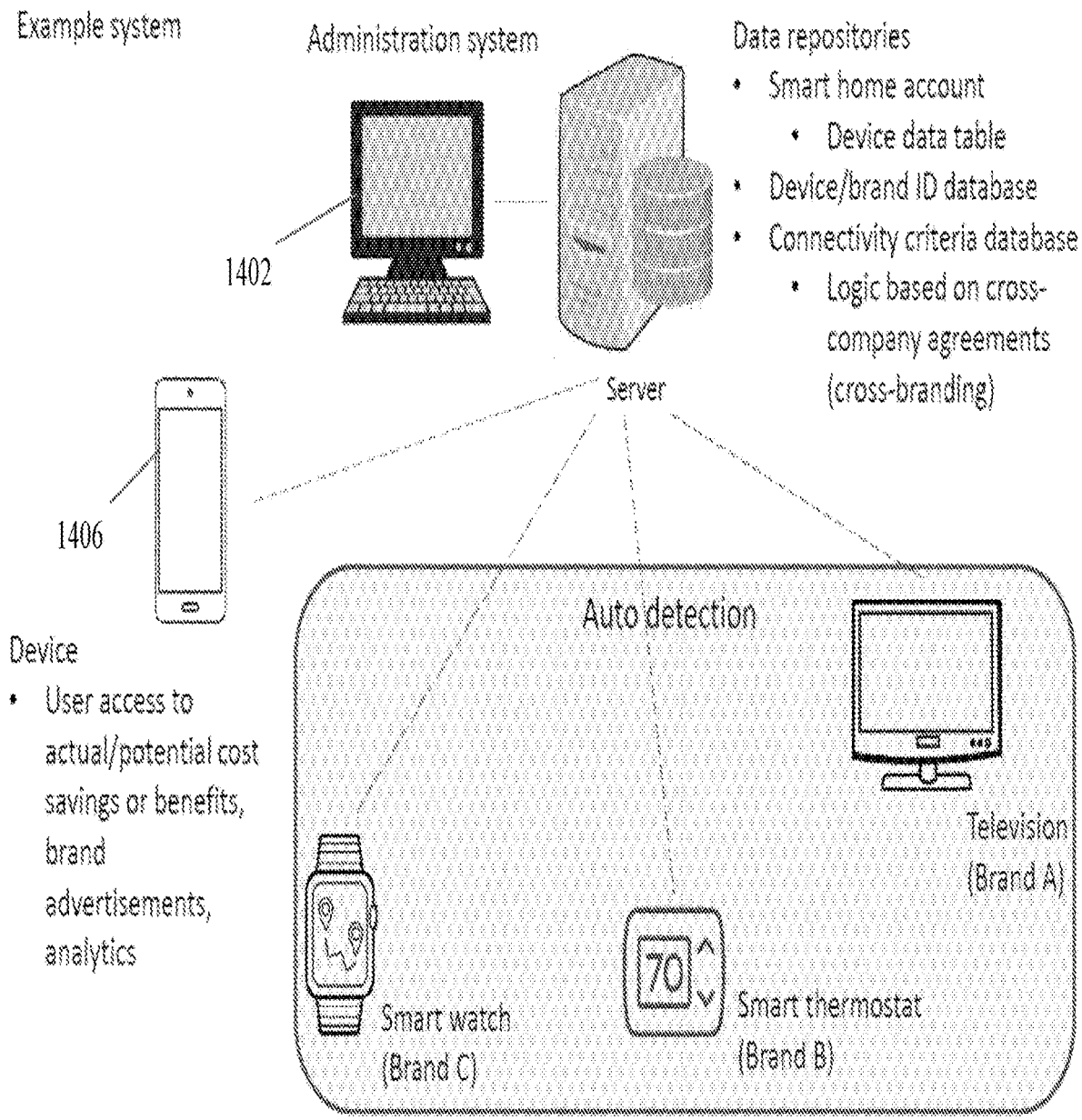
FIGS. 11 through 14 illustrate a system and method for incentivizing users to add more smart devices/products into their home.
Figure 12:
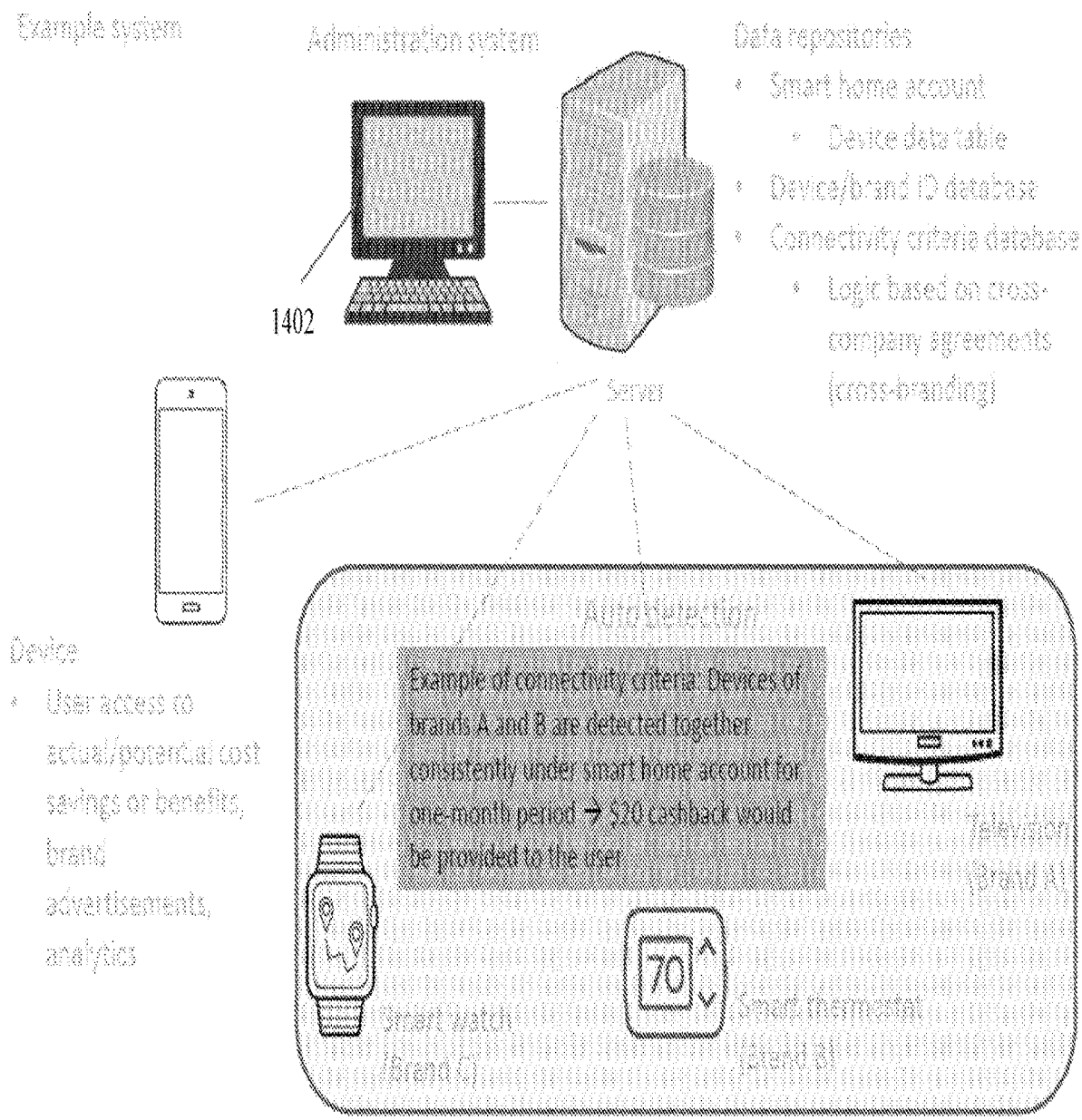

Turning to FIG. 10, an example method for building the recommender engine, particularly the device knowledge base, and the underling process is generally illustrated. Specifically, the objective of this task is to use the information about millions of devices being used by users globally (e.g., brand, device type, sub-device type, model, attributes supported, etc.) to create a recommender system which will function to recommend the most relevant product(s) to the relevant audience, especially those products which will enhance the smart home experience of a user, based on the user's current smart home and device (where device can include in addition or alternatively apps) setup information and association rules learned from devices being used by other users with similar device setups, most popular devices from market research, etc. In a preferred example, the data that is used in the association learning formulation of the recommender system is extracted from API calls that are made to a configuration database, e.g., the UEI "QUICK SET" brand remote control configurator database. This data may be extracted using a last active filter (e.g., based on the API call's date) and grouped by distinct users to get the most current information of different devices used by a user/household. In this manner, from the extracted signatures from the API calls to the database, all the different identified device's information (like brand, model, device type etc. from the "QUICK SET" brand predictive module) can be segregated and mapped to the distinct users while unidentified signatures can be compared to information in an additional database and/or Web searched and again mapped to the distinct users. Furthermore, any extracted geo location of the user (e.g., as obtained from the IP address of the household, information requesting device, or the like) may also be mapped to the user's record. The extracted data may then be stored in a database for further analysis as described in greater detail below, e.g., the information of the devices used by a particular user may be formatted (e.g., made into a list of lists) and fed into a desired algorithm for association rules learning.

In combination with the database of user system information created as above, the recommender system will additionally utilize a database having data for most popular devices and the currently popular devices based on geo-graphical locations (which locations can be of any desired size, e.g., neighborhoods, cities, states, countries, etc.). Such a database can be created using well-known market information gathering/research techniques. Preferably, this marketing data is cleaned of any unwanted information and inconsistencies and structured for further analysis such that the data can then be analyzed to see correlations between different features and geographic clustering to get more insights on most popular devices on a region-by-region bases.

As will additionally be appreciated by those of skill in the art, the captured data may be split into training and test sets, for example using scikit learn's train test split, for the purpose of validating and tuning the performance of the system. In addition, the support and confidence values associated with the machine learning algorithm may be tweaked until a satisfactory recommendation of devices from the machine learning algorithm is achieved.

In use, the recommender system, including the machine learning algorithm that is particularly adapted for frequent item set mining and association rule learning over relational databases and for identifying the frequent individual items in the database and extending them to larger and larger item sets as long as those item sets appear sufficiently often in the database, is used to learn associations between smart home devices/products (e.g., TV, smart switch, smart plug, smart bulb, smart door lock, sound bar, etc.) and through these learned associations arrive at device(s)/product(s) to recommend to a consumer and/or retailer based on a user's current setup of devices/products whereupon the recommendations may be presented to the user and/or the retailer for consideration by being displayed in a device, spoken by a voice assistant, etc.

It will be further appreciated that the recommender system may be utilized to incentivize users to add more smart devices/products into their home and/or to use more devices/products already incorporated into their system. For example, the system may be adapted to check whether the user is qualified to receive a benefit/reward should the user add a particular device/product to their current system configuration, use an existing device, etc. Furthermore, by use of the aforementioned automatic device/product discovery processes, the system may automatically verify user compliance with the conditions of the offer, e.g., that a product has been purchased and installed and, if needed, the date and time of such installation and continued usage of the product/device. Thus, fulfillment of a connectivity criteria could result in the computation and/or provisions of extra user benefits in accordance with agreements.

By way of further example with reference to FIGS. 11 through 14, by combining auto detection and cross-branding analytical features under the smart home environment, the system can allow users to identify and realize extra cost savings or benefits through a convenient system whereby an administration system 1402, in communication (directly or indirectly) with one or more devices in the user's home having the auto-detection capabilities discussed above (or otherwise adapted to provide their own identity data to an accessible data repository) and with a retailer system in the event a retailer interacts with the administration system 1402 to create an opportunity for the consumer, analyzes data/rules within a connectivity criteria database 1404 to check whether the user is qualified to acquire extra benefits based on the devices/products the system determines are currently (and historically if needed) being used (and/or devices/products that can be used in the system) by the user. In this regard, the connectivity criteria database 1404 represents a multitude of cross-company (cross-branding) business agreements among different smart device manufacturers, service providers, etc. such that users would be provided with extra benefits when a given connectivity criteria is fulfilled. The connectivity criteria database 1404 could be updated in real-time to reflect extra user benefit opportunities and cross-branding agreements and database maintenance may involve third-party services, such as "Salesforce," as required. Preferably, the system is also adapted such that a user may use a device 1406, such as a smartphone, to access (or be pushed notifications of) actual or potential cost savings/benefits information/offers, brand advertisements (e.g. e-mail notifications, SMS), and analytics that are derived from the connectivity criteria database considering, as needed, the user's current and/or potential system configurations. User benefits may include cashback rewards, coupons, special offers on future purchases of related brand products or services, reward points, and the like without limitation.

Figure 13:
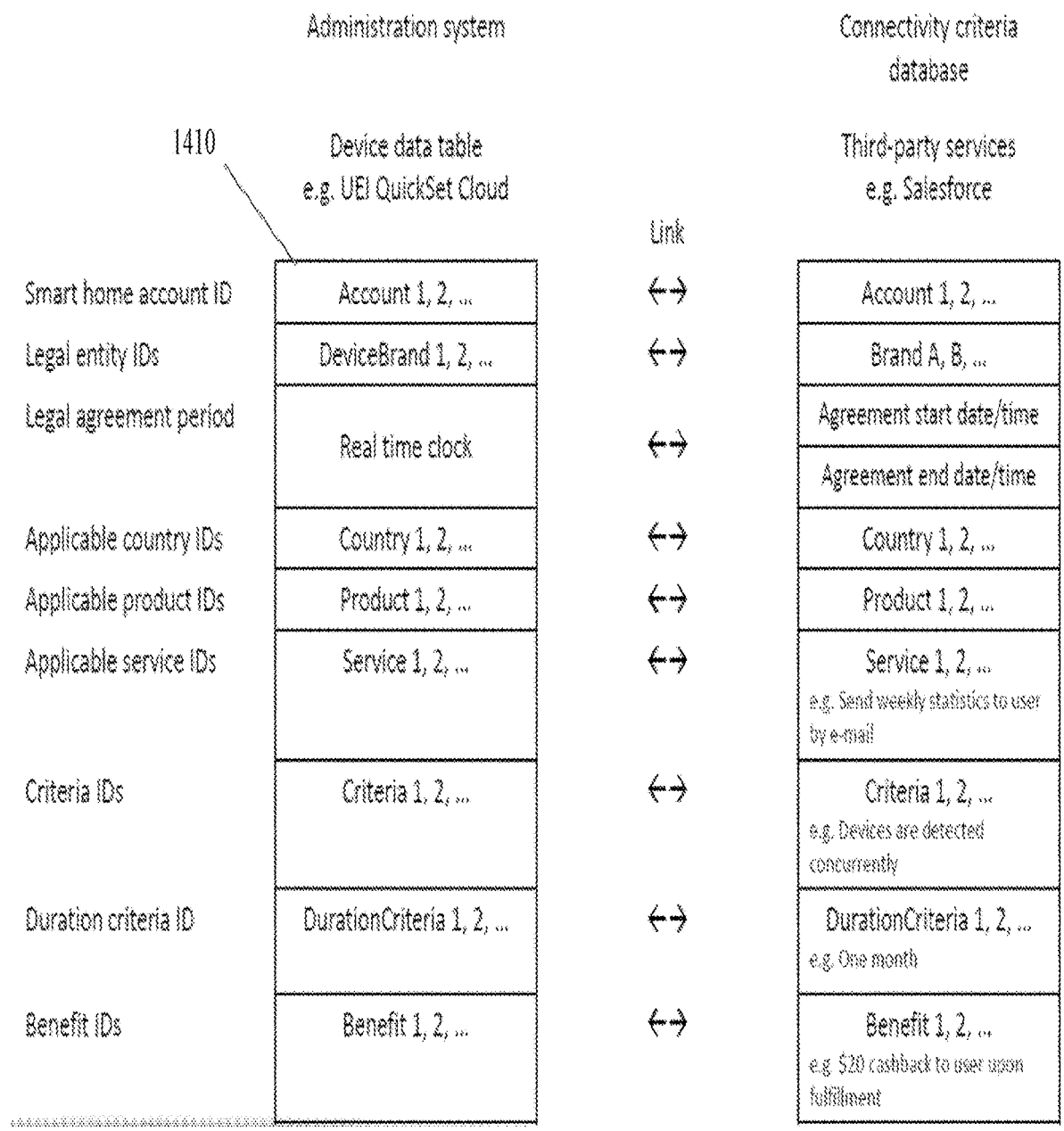
Figure 14:
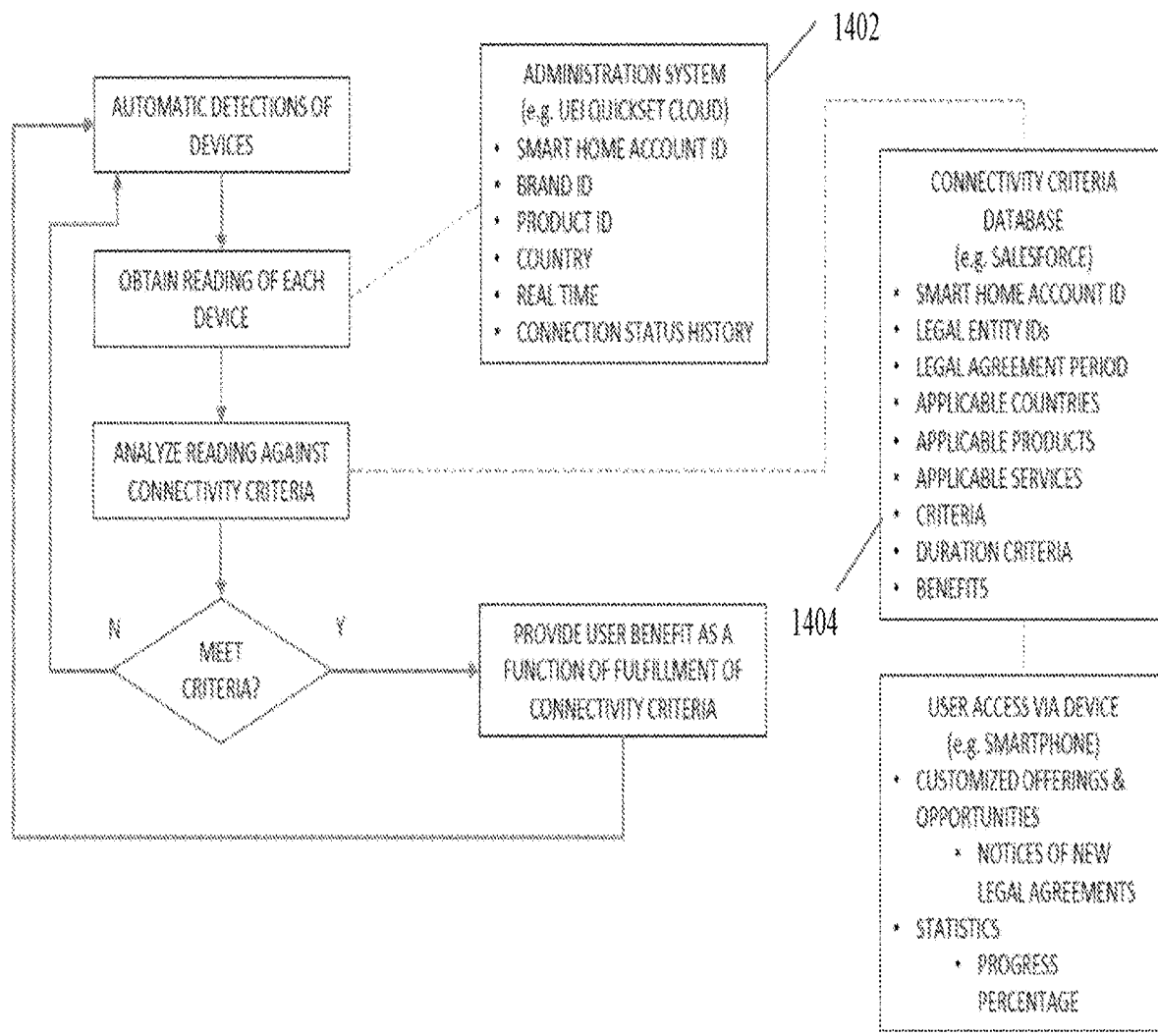

As further illustrated in FIG. 13, the administration of benefits will involve the combined use of the auto detection feature and the connectivity criteria database by the administration system to track the real-time status of connected devices/installed products against the connectivity criteria. To this end, the system will maintain a device data table 1410 which may include device information such as legal entity (e.g., user, home, or the like) IDs, applicable country IDs, applicable product/service IDs, criteria IDs, duration criteria IDs, and benefit IDs for particular home accounts. The device data table 1410 would be utilized to track user/household records and may be analyzed periodically by the administration system against the respective data of connectivity criteria database 1404 to check whether the user is (or possibly can be) qualified to acquire extra benefits. Meanwhile, the connectivity criteria database 1404 (which may be updated as needed by a third party service, retailer, etc.) represents one or more single company and/or cross-company (cross-branding) business agreements among different smart device manufacturers and/or service providers such that users would be provided with extra benefits when a given connectivity criteria is fulfilled. For example, if the devices of brands A and B are detected together consistently under the smart home account for a one-month period (e.g., after the user with a device brand A within their system was offered a reward to purchase a device brand B, offered a reward to use an already owned device brand B with device brand A, etc.), a $20 cash back would be provided to the user. Accordingly, benefits can be offered for when a user adds a branded device to a system having one or more other device of the same or different brand, uses an existing product of a given brand in a specified manner, and the like as desired without limitation.

In a preferred example, the relational database(s) will not only include data that is indicative of the automatically detected devices and services within the household but will also include data that may be associated with information that a user manually provided to the system (e.g., data indicative of devices and/or services manually identified to the system as a part of a controlling device configuration process). Yet further, the relational database(s) may include data for those devices/services with varying levels of trust/reliability. Still further, the collected data may include data indicative of all interactions with the recommendation and/or configuration services offered by the system, usage of the devices, usage of services supported by the devices, etc. This data, which would be preferably collected regardless of which device is used to provide a service in the case where multiple service enabled devices exist in a single household, would then be merged to provide comprehensive snapshot(s) of the user's household. In addition, the captured and merged data, e.g., the appliance/service identifying data noted above as well as data indicative of content that is being access via use a device, a change in a state for a device/service, a user interaction with a device/service, and the like type of usage/telemetry data as can be or as desired to be captured, may be timestamped so that the system may be informed as to when a device/service was first seen, last seen, used, etc., for use in connection with at least the various purposes described herein.

It will also be appreciated that the above described, comprehensive collection of data will also allow the system to be trained in a manner that will particularly improve the prediction, compliance checking, etc. capabilities of the system as the system is able to reprocess/update the household profiles upon repeated usage of the various data collection processes. Thus, it will be further appreciated that this data would be well suited to train models (or in some cases simple rules) for data expansion to add to household profile data in place, e.g., models for use in deriving brand preferences in a household, household categories (such as gamers and streamers), predicting likely churn candidates, deriving time of use, etc. Similarly, such data would be well suited to train models for runtime predictions, e.g., models for predicting patterns such as first action taken in the afternoon (entertainment or smart home) on their TV, basic thermostat temp setting, purchase intention (what would/could they buy next?), etc.

It will be further understood that the recommender system may also be utilized to come up with new hypothesis and reports considering models trained to discern habits and trends. Likewise, the recommender system may be used to train models that are intended to personalize the experience of a household no matter through what device a third party service may be accessed. To this end, the system may function to merge a household view across enabled devices, independent of the devices explicitly being linked together, whereupon the experience of the household on other third party services may be personalized based on derived household profiles that can be retrieved for the household by any such third party services.

While it is contemplated that the system may analyze usage data on the recommender (or device setup/configuration) services to obtain insight into the household, e.g., by monitoring API calls to a device configuration service, such as UEI's "QUICKSET" brand service, by monitoring API calls to a streamer service to determine what media is being accessed/watched, by capturing data such as when a TV is turned on and when it was first installed, etc., in a preferred example any such data will not, if provided to a service outside of the household, contain user identifiable data. To this end, such data may be abstracted as required to avoid violating privacy laws or may otherwise be maintained on and be accessible only by devices within a secure local area network. In this use case, it will also be appreciated that any services, such as the above-described recommender services, any device configuration services, etc., may be performed locally where the required "comparison" data is also locally maintained and, to the extent any cloud services are required to be used, any data that is provided to such services is again abstracted to avoid the dissemination of any user identifiable data. Thus, a household profile may exist in the cloud in an abstracted manner and/or may also reside on a device such that the information remains within the user's network as a decentralized system and each device within the user's network may share data within the home network (e.g., acting as a smart edge device) for synchronizing the profile across all of the local area network connected devices.

When data is stored in the relational database, a household identifier, such as an IP address, may be used to cross-reference appliance and/or usage data to a given household. It may, however, be desirable to use an alternative identifier as it is recognized that IP addresses can change over time. Thus, in some instances, a service identifier, such as a device ID for a device supporting a configuration service, can be used once a profile is in place to remap new public IPs to an existing household as they evolve/change on an ongoing basis. Furthermore, because public IPs correlated to user recognizable data may also provide a security concern, in some instances such data may be kept private through use of hashing schemes that never have access to originals, key vaults limiting personal access to data outside of runtime environments, etc.

In view of the foregoing, it will be appreciated that the described recommender service has, among other advantages, the advantage of providing a real-time view of what different types of households are currently doing (or not doing) in specific timeframes, e.g., what devices/products are installed in a user's home network and how the installed devices/products are being used. Accordingly, it will also be appreciated that this real-time view can be used to provide targeted advertising via the use of retargeting tags, e.g., derived data that is used to select advertising that is to be presented to a user. For example, when a user accesses a particular website, cloud service, or the like that supports advertising, through retargeting tags, the system can map a household to certain attributes and automatically adjust the advertising within (or advertising to be added to) the content that is being accessed based on the household profile, e.g., the system can tag the household to a "PlayStation" brand gaming household that has a 6 year old "Sony" brand TV and a household that is therefore likely to buy a new TV, and more likely to buy a "Sony" brand TV such that the advertising in the website or cloud service is adjusted to present an advertisement for at least a "Sony" branded TV. As noted above, this advertising service may be performed locally to ensure compliance with privacy laws and, to this end, may require a plurality of advertisements to be pre-stored in a local device for selection of a desired advertisement based on a locally determined retargeting tag.

In a further example, when the system tags a household as using a particular brand or service the system can promote different and compatible devices as desired. To this end, when a user visits a support/help website and/or interacts with a virtual agent on any device, the system will be provided with information about what devices and/or services a user has at home and what the user could be looking for, e.g., the knowledge could be gleaned from a user asking to setup/troubleshoot an issue with a particular device and/or service. In such an instance, the system can use the gleaned knowledge to contact a third party provider, third party retailer, etc. whereupon the third party can target the user for an offer, benefit, etc. Thus, the system can be used to proactively send notices to pay-tv operators on possibility of churn in a household, so they can offer new incentives before a churn occurs, target a push notification to user of a specific model/brand and year of TV that has a specific new security flaw that needs to be corrected, to offer purchasing opportunities, to offer upgrade possibilities, and the like without limitation.

By way of still further example, the system can repeatedly use a device discovery process to automatically determine a configuration of a home network system of the user, e.g., the devices/apps installed on the network and/or the services that are installed on the devices. The repeatedly determined configuration of the home network system of the user can then be examined by the machine learning algorithm(s), using historical data captured from other households, to determine if a change in the system has occurred and to determine if the detected system change is indicative of the user being likely to drop a service that is being accessed via the home network system of the user, i.e., that the user is likely to churn. Such a change can be a detected disconnection of a STB in favor of a streaming device, the simple addition of a streaming device to the user's home network, the installation of a particular service on a streaming device, the use of a streaming device more frequently than a STB, etc. as determined via use of the noted machine learning processes. As before, when the system determines that a user is likely to churn, the system can cause an appropriate notification to be sent to the service provider.

As noted above, when suggested replacement or add-on products (which may include apps and/or services) have been identified, these products, apps, and or services may be called to the attention of a retailer whereupon the information can be used by the retailer to direct market to the consumer. In this manner, retailers, such as smart device manufacturers and service providers, can utilize the generated information to, among other things, increase market penetration in the smart home environment.

By way of further example, a retailer, a manufacturer, or the like (referred to herein simply as a "retailer"), such as a retailer of smart TVs, might want to specifically identify opportunities to increase penetration into living rooms of users. In such case, the smart TV retailer could register one or more target business opportunities (e.g. requesting an opportunity to target users with no smart TVs in living rooms) in a connectivity opportunity database associated with the recommender system. Thus, using the auto detection and location-aware features discussed about and a reverse-marketing approach, the subject systems would allow smart device retailers to conveniently receive notifications or reverse advertisements from the system when their target business opportunities have been identified.

More particularly, it is contemplated that the described systems could be utilized to provide a reverse advertisement capability. For example, the system can use device, app, owner, and the like information obtained as described above to identify an exploitable household or room configuration of a home network system of the user to a business entity/third party. The previously described device discovery process could be used to automatically determine a room, home theater, or other location or interconnectability identifiable configuration of a home network system of the user and the determined grouping of devices and/or configuration of the devices of the user would be used to automatically verify a compliance by the opportunity settings of a business entity with a condition for receiving the reverse advertisement. The reverse advertisement would be provided to the business entity when the determined room and/or household, and/or home theater, and/or other identiable configuration of the home network system of the user is determined to be in compliance with the condition for receiving the reverse advertisement.

It will also be appreciated that, by leveraging the ability of the system to support voice commands, the voice commands can be used to discern device, apps, and location information and associations as desired. For example, in a scenario where a user requests a specific voice enabled platform to "turn on the lights in the living room" or "lock the backdoor" an association between a location within a home, a controllable device, and a voice enabled platform (and/or app) can be established. Thus, to provide smart device retailers with increased opportunities, the subject system could be adapted to combine the use of auto detection and location-aware features to define the room/position (e.g. living room, backdoor, home entertainment center) of each connected smart device based on the application of Natural Language Understanding (NLU) feature.

Figure 15:
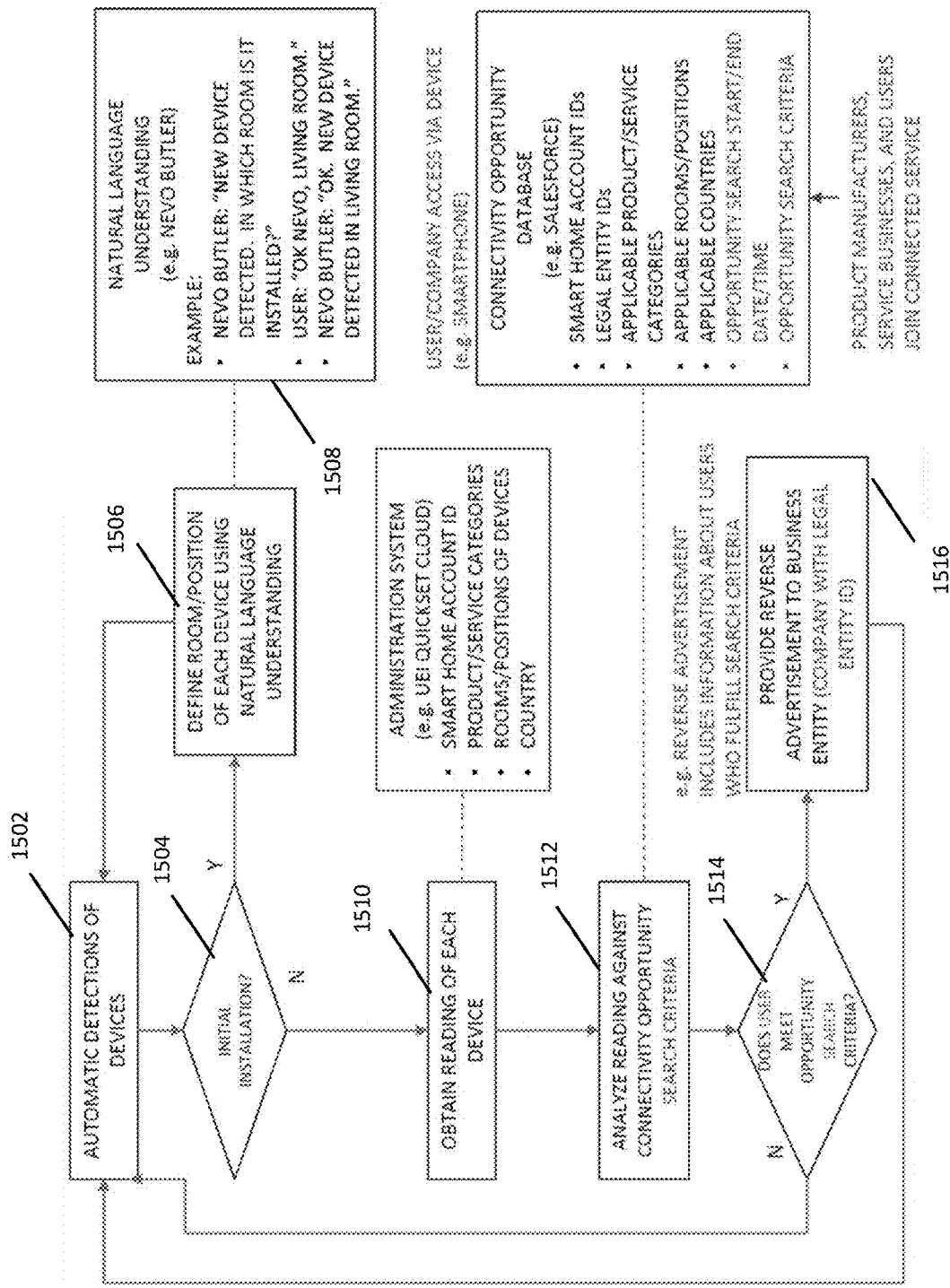
FIG. 15 illustrates a method for identifying reverse advertisement opportunities.

Turning to FIG. 15, to provide such reverse advertising, the system may be utilized to periodically monitor the equipment in the home of a user 1502. When the system determines that a new piece of equipment is present in the user's home system 1504, for example when the system auto detects installation of a new smart or IOT device as described above, the system can automatically control a smart speaker (e.g. a "Nevo Butler" brand digital voice assistant) to request that the user specify to the smart speaker the room/position of the newly connected device 1506. The user will then provide a voice response to the smart speaker to specify the room/position of the connected device 1508. It is to be appreciated that other location determination methods could also be utilized for this same purpose. Examples of further methods for determining an absolute or relative location of a controlled device and/or the absolute or relative location of a controlling smart device (from which the location of a controlled device can be inferred) can be found in U.S. Pat. No. 8,180,37, the disclosure of which is incorporated herein by reference in its entirety. Captured device identifying information cross-referenced to location identifying information is then stored in a relational database.

When the process illustrated in FIG. 15 is caused to be executed, the system may additionally poll the devices to determine if one or more devices have been removed from the household or have been relocated within the household. The information collected during this step will likewise be stored in and/or used to update the information stored in the relational database.

When determining if a reverse advertising opportunity exists for a retailer, the system will access device information 1510, e.g. from the devices directly and/or from the administration database, and the collected information will be compared against the conditions for various retailer opportunities 1512 defined in the connectivity opportunity database. The connectivity opportunity database represents a multitude of smart device retailers' target business opportunities based on users' household room configurations such that smart device retailers would be provided with reverse advertisements when an opportunity condition for receiving the reverse advertisement is identified.

As noted, the system may maintain a device data table which may include information such as legal entity IDs, applicable product category IDs, applicable room/position IDs, and applicable country IDs for the purpose of business-opportunity searches by smart device retailers. The administration system may then track the status of rooms/positions of the users' connected smart devices against the connectivity opportunity database. In addition, retailers may be provided with access to users' home network system configuration information and related analytics to thereby allow the retailers to review such information for possibly defining still further opportunities. The user's home network system configuration information may be abstracted when accessed by third parties to thereby ensure privacy of a given user or a user may be required to opt-in to this feature.

When the conditions of an opportunity are determined to be met by the system 1514, e.g., if smart TVs are not detected in the users' living rooms, the administration system could send automatic notifications or reverse advertisements 1516 to one or more smart TV retailers about exploitable opportunities that exist in the living rooms of specified users. By utilizing the opportunity information on the users' household room settings, administration system could send notifications or reverse advertisements to one or more smart device retailers, which in turn would allow these smart device retailers to send targeted advertisements to potential buyers who already possess a connected smart home system. The contact with a buyer by a retailer could be direct or it may be required to be through the system administrator to provide some degree of separation between system users and retailers. In some instances, the system can facilitate the providing of advertising to a user via use of their connected smart device.

In sum, by utilizing the powerful device discovery features of the subject systems, the described systems may allow smart device retailers to at least semi-automate routine marketing and sales processes to identify target business opportunities (e.g. target users who already possess a connected smart home system but not the smart devices on sale), set the product selling price, send targeted advertisements to these target users, and arrange online purchases by these target users.

To facilitate the automation of the marketing and sales processes, the system will leverage the application of artificial intelligence (e.g. machine learning) and rule-based expert systems whereby some basic marketing and sales expertise are captured in a collection of rules that are implemented under the connected service environment through the collective intelligence of an administration system and smart device manufacturers. These rules and learning processes may take into consideration the users' unique configurations in their home network systems, users' online behaviors, market conditions, and smart device manufacturers' motivations to maximize sales Periodic data curation by the system administrator and automatic implementation of a Frequent Pattern Growth Algorithm by the administration system is preferably utilized with the rules and learning processes to highlight specific business opportunities for smart device manufacturers. An association rule learning principle is also preferably utilized to discover strong relations among the variables stored in the databases (e.g., relations among general device/service category IDs such as Television, Smart thermostat, and Smart bulb). Via use of these techniques and processes, auto-detected devices/services in the users' household configurations may be captured by the administration system as a collection of device/product category IDs and service category IDs that could be linked to existing knowledge graphs and the autodetected device/service dataset may then be curated in accordance with the predefined settings of basic key parameters of association rule learning principle such as minimum support threshold, support, confidence, and lift.

It will also be appreciated by those of skill in the art that system administrators could manually adjust the key parameters and apply data curation and/or that the data-curation process itself could be automated by tracking and optimizing these key parameters such that the total number of new auto detections is maximized in the system. Furthermore, it is to be understood that using an Association Rule Learning principle, Frequent Pattern Growth Algorithm to automatically discover frequent patterns/combinations of specified device/service category IDs provides a time and cost improvement as compared to using a conventional Apriori Algorithm for this same purpose.

After targeted advertisements are sent out by a business entity to target household users, it is contemplated that there is a realistic possibility that these household users would still like to consider alternative options for purchase. To address this possibility, when a pre-determined criteria/conditions established by one retailer is fulfilled, this fulfillment could also trigger the administration system to monitor for still further conditions established for sending one or more reverse advertisements to one or more other relevant business entities. By way of example these further criteria/conditions may include: a determined inaction by target household users (no auto detection of advertised device/service) for a pre-determined period of time (e.g. 10 days); a determination that another relevant business entity would be able to sell devices/services whose categories are the same as the advertised ones (e.g. smart bulb); a determination that another relevant business entity has at least one device/service that is already installed in the target household configuration (brand loyalty scenario); a determination that an original targeted advertisement sent to users does not include any discount/rewards; etc.

It will also be appreciated that in some instances the system may utilize an estimated probability (P) or relevant predictive modeling information to identify still further marketing opportunities. For example, the system will automatically discover various frequently occurring category patterns/combinations, e.g., households having a smart television, smart thermostat, and a smart bulb. When the system determines that a household partially fulfills a frequent-pattern-based household configuration criteria, e.g., has a smart television and a smart thermostat, the system may automatically send reverse advertisements to retailers of a high probability missing component, e.g., to smart bulb manufacturers Y & Z, about opportunities to target households that could potentially follow similar purchasing patterns. Each frequent pattern fulfillment preferably carries a confidence value, determined using a Binary Classifier model or the like. The confidence value, for example a value that indicates the estimated probability (P) that the missing component(s), e.g., a smart bulb, will become automatically detected in a household after providing a targeted advertising to that household, can further be utilized by the system, retailers, or the like to define discounts/rewards, etc. for target households.

As noted above, with the power of automatic device discovery and the building of a household profile database of frequently occurring category patterns/combinations of what users own and what users use in their home, advertising for the purpose of promoting a smart home device, content, or service, can be facilitated by building a target list of homes and then serving a linear advertisement to each of those homes across various digital properties including video streaming services, websites, etc. In another approach, rather than provide advertisements based on what the system determines a user would own given, the advertisements that are presented to a user are based on devices that the system knows the user actually owns. In this manner, advertisements can be sent to a user where the focus of the advertisement messaging is on scenarios possible when using a promoted device or service specifically with one or more devices that already exist in the home where the advertisement is being served. As before, the advertisements and/or data used to select the advertisements can be maintained on a device within the household of the user and the advertisement selecting or filtering process can be performed based on the stored household profile data, e.g., the advertising can be selected or filtered to be specific to an "Xbox" gaming platform or a "PS" gaming platform when it is known that a household includes one of these gaming platforms. In this regard, it will be appreciated that the advertising can be added to content that is otherwise being presented to a user, e.g., content that is being accessed via a browser, a streaming device, etc., can be caused to be displayed to a user in the advertising/recommendation app, and/or the like as desired to meet a given need.

In a further example, the system is utilized to address a problem that arises in the field of digital advertising. Specifically, in the field of digital advertising, marketers typically decide on one or more segments of the user population that the marketers desire to reach. The marketers then organize advertising campaigns to target those segments using a targeting/segment definition tool, e.g. to target all those males between 16 and 50 years of age that have shown or are likely to show an interest in home security and automation. The problem that arises from such an advertising method is that, when marketers cannot use a single targeting platform to manage their advertising campaigns, for example due to walled gardens being built around the devices/services offered by all the major brands, such as Roku, Google, Samsung, LG, the marketer may be overspending to reach the same exact user through multiple ones of these different platforms.

To address this problem, the system may particularly use one or more of the household targeting/filtering schemes described above in which advertisements that are caused to be delivered to a user via use of different platforms are tracked. Specifically, using the described household profiling, the system can be used to track and identify when and how a household has seen a specific advertisement and can then prevent the same advertisement from surfacing in the same house again as desired. For example, if the system determines that an advertisement is presented to a user via use of a first platform (e.g., a Sony platform system), the system can prevent the same advertisement (or a similar advertisement which has been identified by the marketer as being an advertisement that can be blocked) from being presented to the user via use of another platform (e.g., a ROKU platform system). The advertisement may be blocked from appearing on the other system (or even the first system if the advertisement is designated to one time showing on the system on which it was first viewed) for a predetermined period of time and then the method can be repeated, e.g., the re-presentation of the advertising on a given device/service can be sensed and a future re-airing of the advertising can be blocked as needed. The blocking of an advertisement can also consider the cost to the advertiser. For example, the advertiser can designate that an already viewed advertisement is to be blocked from being displayed on one or more platforms if the cost of presenting the advertising exceeds a preset threshold. To this end, the system may communicate with a system that tracks the real-time cost associated with presenting a given advertisement, particularly when the cost is dynamic, as needed. Still further, the blocking of advertisements can be content provider limited, e.g., if an advertisement is determined to have been presented via use of a first content streaming service, the display of related advertisements (e.g., the same or cross-referenced advertisements) can be prevented from being presented (on the same or a further device) via use of a second content streaming service.

This filtering/blocking of advertising can be done using different approaches with each approach providing useful capabilities. In one approach the household identification service/capability described above can be used to report information to a marketer's system and the marketer can use the reported information to keep track of each reached audience to thereby prevent future presentations of the same or a similar advertisement in other networks available to the same household. To this end, the marketer's system can send an instruction to one or more device that one or more advertisements are to be filtered/blocked from being provided to a user. The instructions can also provide further limitations for the filtering/blocking as needed, for example, that the filtering/blocking is to be in effect for a given period of time, for given time(s) of day, for one or more specific user's being present within the viewing area of a device, and the like without limitation.

In a similar manner, the described household identification service/capability can be built into AV devices in the home where the household identification service/capability can also be used in private advertising insertion models such that a device/service is caused to only retrieve new advertisements not seen before in the same house, regardless of whether an advertisement was seen on the same or a different device in the same household. This approach seeks to go beyond a single device in the home, trying to optimize the experience across devices used for media streaming, allowing all devices to exchange this information.

In a still further option, a decentralized blockchain that can be used as a way to exchange advertising viewership data between different walled gardens to thereby avoid a central ownership of the data while still allowing this data to be shared. As will be appreciated by those of skill in the art, this can be done either on the internet where the needed data is accessible by different cloud services, or privately in the home network where the needed data is shared among the devices in the home network.

While various concepts have been described in detail, it will be appreciated by those skilled in the art that various modifications and alternatives to those concepts could be developed in light of the overall teachings of the disclosure. For example, while the user interface portion of the illustrative product recommendation system and method described takes the form of a smart device app, it will be appreciated that other embodiments are possible, for example in the form of a PC or Web tablet application, either locally resident or server-based. Additionally, while the databases used for storing setup and configuration information, command code sets, and product feature/function reference may for simplicity be illustrated herein as co-located on a single Web server, it will be appreciated that individual data sets may be located across a multiplicity of servers as long as all are accessible to the product recommendation application. Accordingly, it will be appreciated that the method described herein could be implemented in general as computer-executable software associated with one or more network servers, i.e., a hardware platform, with the software being stored on a computer-readable media embodied in a physical device such as a hard disk drive, memory card, and the like.

Further, while described in the context of functional modules and illustrated using flowcharts and/or block diagrams, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the disclosure. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the disclosure set forth in the claims without undue experimentation. It will be additionally appreciated that the particular concepts disclosed are meant to be illustrative only and not limiting as to the scope of the disclosure which is to be given the full breadth of the appended claims and any equivalents thereof.

All patents and patent applications cited within this document are hereby incorporated by reference in their entirety.

What is claimed is:

1. A method for providing advertising, comprising:
   extracting by a monitoring application signatures from an application programming interface (API) calls sent from a remote control application resident on at least one controlling device within a home network system to an external, remote control configuration application that provides to the remote control application data for configuring the remote control application;
   using the signatures extracted from the API calls to update a relational database in which is stored installed device information for the home network system, the installed device information indicating at least a first media accessing device and a second media accessing device within the home network system;
   determining that a first advertisement has been caused to be presented via the first media accessing device; and
   in response to determining that the first advertisement has been caused to be presented via the first media accessing device, updating the relational database with a blocking information to automatically prevent the second media accessing device from causing a second advertisement to be presented via use of the second media accessing device.

2. The method as recited in claim 1, wherein the first advertisement and the second advertisement are the same advertisement.

3. The method as recited in claim 1, wherein the first advertisement and the second advertisement are related to each other by being cross-referenced to each other in a data store of advertisements.

4. The method as recited in claim 1, wherein using the information to automatically prevent the second media accessing device from causing the second advertisement to be presented comprises preventing the second media accessing device from accessing the second advertisement within a data store of advertisements.

5. The method as recited in claim 4, wherein the data store of advertisements is stored in a memory of the second media accessing device.

6. The method as recited in claim 1, wherein using the information to automatically prevent the second media accessing device from causing the second advertisement to be presented comprises causing the second media accessing device to filter received advertisements to remove therefrom the second advertisement.

7. The method as recited in claim 1, wherein the first media accessing device comprises a first media streaming device operating on a first media streaming platform and the second media accessing device comprises a second media streaming device operating on a second media streaming platform different than the first media streaming platform.

8. The method as recited in claim 1, wherein the first advertisement is caused to be presented by the first media streaming device when a first content providing service is accessed and using the information to automatically prevent the second media accessing device from causing the second advertisement to be presented comprises automatically preventing the second advertisement to be presented when a second content providing service different that the first content providing service is accessed.

9. The method as recited in claim 1, further comprising causing the information that indicates at least the first media accessing device and the second media accessing device within the home network system of the user to be stored only within a memory of a one of the first media accessing device and the second media accessing device.

* * * * *